United States Patent
Ikui

(10) Patent No.: US 12,519,322 B2
(45) Date of Patent: Jan. 6, 2026

(54) CONTROL DEVICE, POWER SUPPLY DEVICE, COMPUTER-READABLE STORAGE MEDIUM, AND CONTROL METHOD

(71) Applicant: HONDA MOTOR CO., LTD., Tokyo (JP)

(72) Inventor: Kuniaki Ikui, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 780 days.

(21) Appl. No.: 17/849,699

(22) Filed: Jun. 26, 2022

(65) Prior Publication Data

US 2022/0329092 A1    Oct. 13, 2022

Related U.S. Application Data

(63) Continuation of application No. PCT/JP2020/049035, filed on Dec. 25, 2020.

(30) Foreign Application Priority Data

Dec. 27, 2019 (JP) ................. 2019-238700

(51) Int. Cl.
*H02J 7/00* (2006.01)

(52) U.S. Cl.
CPC ...... *H02J 7/00045* (2020.01); *H02J 7/00036* (2020.01)

(58) Field of Classification Search
USPC ....................................................... 320/106
See application file for complete search history.

(56) References Cited

U.S. PATENT DOCUMENTS

| 5,717,306 A * | 2/1998 | Shipp ............. H01M 10/48 429/90 |
| 2005/0108309 A1 * | 5/2005 | Tsuboka ............ G06F 21/445 708/250 |

(Continued)

FOREIGN PATENT DOCUMENTS

| CN | 104718660 A | 6/2015 |
| CN | 106063271 A | 10/2016 |

(Continued)

OTHER PUBLICATIONS

Machine Translation of JP2014082135A (Year: 2014).*

(Continued)

*Primary Examiner* — Samuel Berhanu

(57) ABSTRACT

A control device comprises: a first identification information acquiring unit configured to acquire first identification information which is identification information for identifying the power accumulation device; a second identification information acquiring unit configured to acquire second identification information which is identification information for identifying the power device; and a determining unit configured to determine, when the first identification information and the second identification information do not match, (i) to prohibit or limit power exchange between the power accumulation device and the power device, (ii) to output an identification abnormality signal indicating that the first identification information and the second identification information do not match, or (iii) not to output an identification normality signal indicating that the first identification information and the second identification information match.

17 Claims, 18 Drawing Sheets

(56) References Cited

U.S. PATENT DOCUMENTS

| | | |
|---|---|---|
| 2009/0256717 A1 | 10/2009 | Iwai |
| 2011/0248668 A1 | 10/2011 | Davis |
| 2016/0309156 A1 | 10/2016 | Park |
| 2017/0063852 A1* | 3/2017 | Azar ................ G06V 40/70 |
| 2018/0090942 A1* | 3/2018 | Nunez ................ H02J 7/0045 |
| 2019/0389325 A1 | 12/2019 | Shiiyama |

FOREIGN PATENT DOCUMENTS

| | | | |
|---|---|---|---|
| CN | 107835297 | A | 3/2018 |
| EP | 0902520 | B1 | 7/2002 |
| EP | 2518857 | B1 | 3/2018 |
| JP | 2012027594 | A | 2/2012 |
| JP | 2012085470 | A | 4/2012 |
| JP | 2013037637 | A | 2/2013 |
| JP | 2018160171 | A | 10/2018 |
| WO | 9616451 | A1 | 5/1996 |
| WO | 2014061249 | A1 | 4/2014 |

OTHER PUBLICATIONS

Office Action issued for counterpart Chinese Application 202080089154.6, issued by the State Intellectual Property Office of People's Republic of China on Jun. 13, 2024.

International Preliminary Report on Patentability for International Application No. PCT/JP2020/049035, issued by the International Bureau of WIPO on Jun. 28, 2022.

Extended European Search Report for counterpart European Application No. 20906360.1, issued by the European Patent Office on May 4, 2023.

Examination Report issued for counterpart Indian application 202217041519, issued by the Patent Office of India on Apr. 25, 2025.

* cited by examiner

1000

| COLLA-TION ID 1012 | UNIQUE ID 1014 | USER ID 1016 | VALIDITY PERIOD 1018 ||
|---|---|---|---|---|
| | | | BEGINNING POINT | END POINT |
| M_0001 | B_0001 | U_0001 | None | None |
| M_0002 | B_0002 | U_0002 | YY/MM/DD | YY/MM/DD |
| | B_0003 | | | |
| | B_0004 | | | |
| M_0003 | B_0005 | U_0003 | None | YY/MM/DD |
| | B_0006 | U_0004 | | |
| .. | .. | .. | .. | .. |

| UNIQUE ID | UPDATE HISTORY ||| |
|---|---|---|---|
| | RECORDING TIME OF DAY | COLLATION ID | UPDATED TERMINAL ID |
| B_0001 | 2019/12/10 15:30 | M_0001 | WTR_0001 |
| | 2019/12/11 09:20 | N/A | STA_0001 |
| | 2019/12/11 11:50 | M_0255 | STA_0001 |
| | .. | .. | .. |
| B_0002 | 2019/12/10 09:20 | M_0001 | STA_0001 |
| .. | .. | .. | .. |

1112 — UNIQUE ID column
1114 — UPDATE HISTORY column

| UNIQUE ID (1212) | RECEPTION HISTORY (1214) | | |
|---|---|---|---|
| | RECEIVING TIME OF DAY | COLLATION ID | TRANSMITTING TERMINAL ID |
| B_0001 | 2019/12/10 15:35 | M_0001 | TRS_0001 |
| | 2019/12/11 11:52 | M_0255 | TRS_0022 |
| | .. | .. | .. |
| B_0002 | 2019/12/10 09:21 | M_0001 | TRS_0001 |
| .. | .. | .. | .. |

FIG.12

| EVENT / COL-LATION ID | MB1512 IS HANDED OVER TO USER | VEHICLE 1522 IS EQUIPPED WITH MB1512 | MB1512 IS RETURNED TO STATION | STATION ISSUE MB1514 | VEHICLE 1524 IS EQUIPPED WITH MB1514 |
|---|---|---|---|---|---|
| COLLATION ID STORED IN MB1512 | 112233 | 112233 | 112233 | None (AWAITING) | None (AWAITING) |
| COLLATION ID STORED IN MB1514 | None (AWAITING) | None (AWAITING) | None (AWAITING) | None (AWAITING) | None (AWAITING) |
| COLLATION ID FED BY ID FEEDING UNIT OF VEHICLE 1522 | 112233 | 112233 | 112233 | 112233 | 112233 |
| COLLATION ID FED BY ID FEEDING UNIT OF VEHICLE 1524 | 556677 | 556677 | 556677 | 556677 | 112233 |

FIG.15

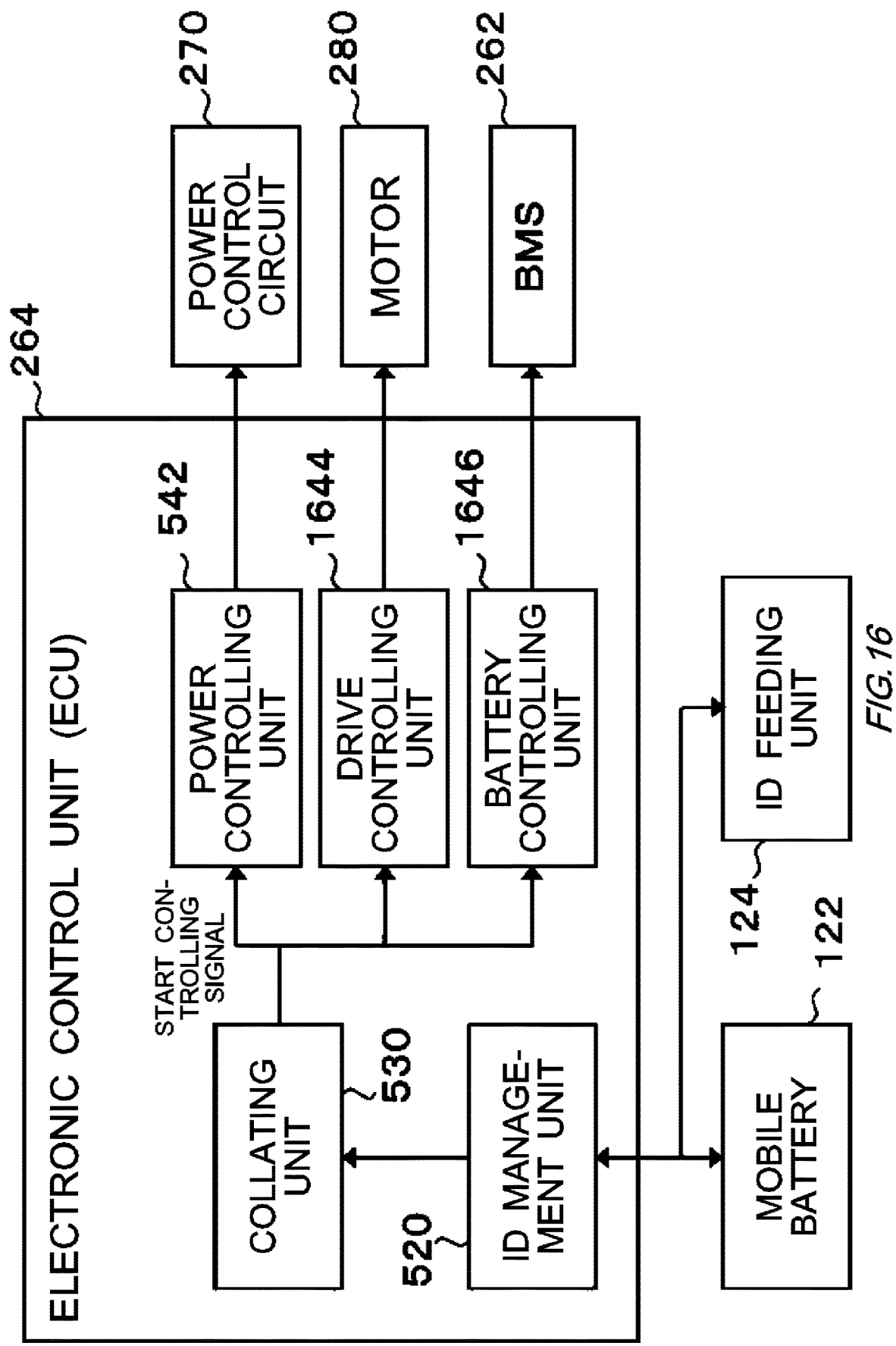

CONTROL DEVICE, POWER SUPPLY DEVICE, COMPUTER-READABLE STORAGE MEDIUM, AND CONTROL METHOD

The contents of the following Japanese application and International application are incorporated herein by reference:

NO. 2019-238700 filed in JP on Dec. 27, 2019
NO. PCT/JP2020/049035 filed in WO on Dec. 25, 2020

BACKGROUND

1. Technical Field

The present invention relates to a control device, a power supply device, a computer-readable storage medium, and a control method.

2. Related Art

A service that supplies electric power by using a portable or detachable battery is known (for example, see Patent Document 1).

PRIOR ART DOCUMENT

Patent Document

[Patent Document 1] Japanese Patent Application Publication No. 2018-160171

BRIEF DESCRIPTION OF THE DRAWINGS

FIG. 10 schematically shows an example of a data table 1000.

FIG. 11 schematically shows an example of a data table 1100.

FIG. 12 schematically shows an example of a data table 1200.

FIG. 15 schematically shows an example of the transition of the collation ID.

FIG. 16 schematically shows another example of an ECU 264.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are necessarily required for solutions of the invention. Note that identical or similar portions in figures are given identical reference numbers and the same explanation is omitted in some cases.

[Outline of Battery Management System 100]

Figure 1:
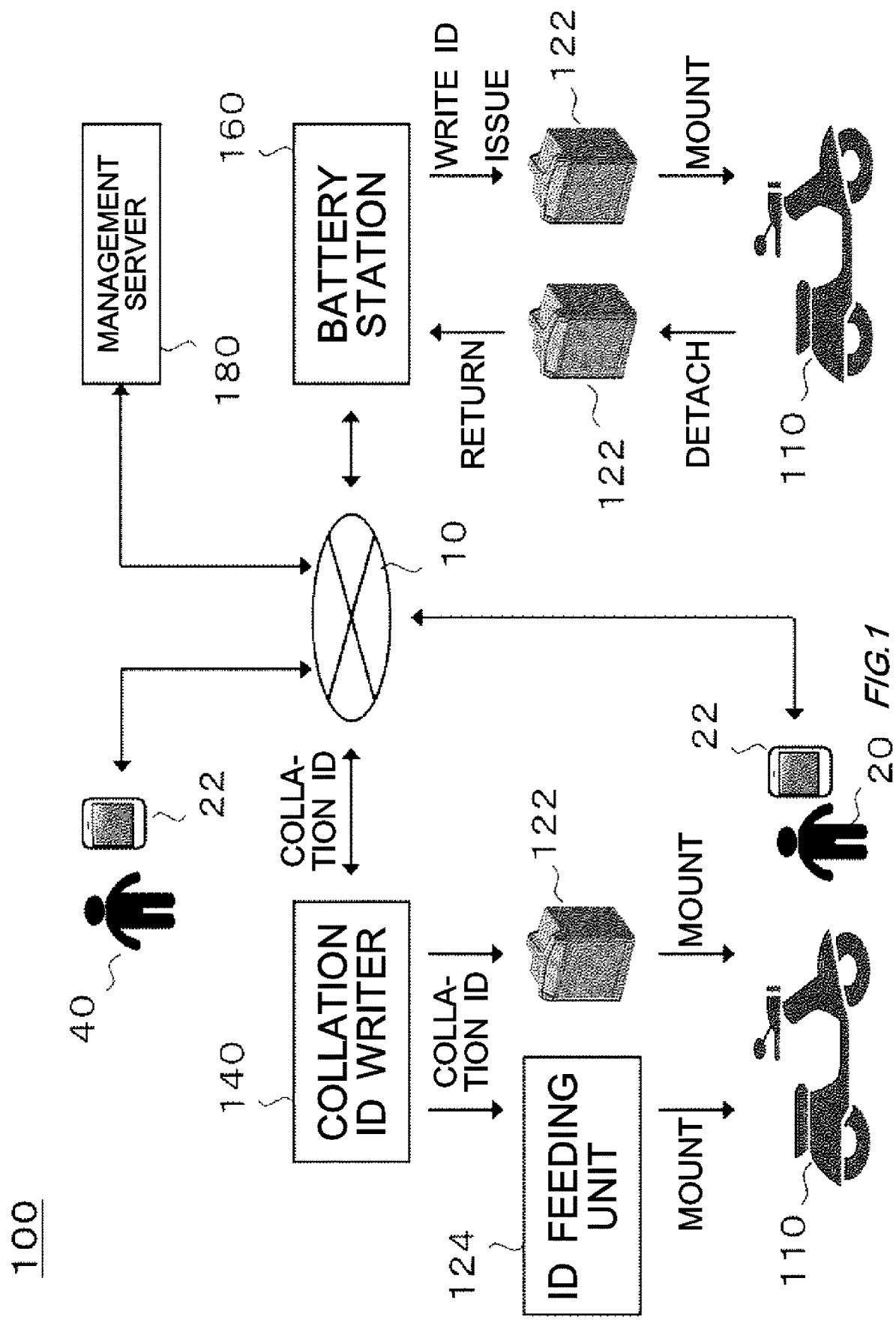
FIG. 1 schematically shows an example system configuration of a battery management system 100.

FIG. 1 schematically shows an example system configuration of a battery management system 100. In the present embodiment, the battery management system 100 includes an electric motorbike 110, a mobile battery 122, an ID feeding unit 124, a collation ID writer 140, a battery station 160, and a management server 180. Note that the system configuration of the battery management system 100 is not limited to the present embodiment. In another embodiment, the battery management system 100 may be constructed of some of the above-mentioned components.

Each unit of the battery management system 100 may transmit and receive information to/from one another via a communication network 10. Each unit of the battery management system 100 may mutually transmit and receive information to/from a communication terminal 22 used by a driver 20 of the electric motorbike 110. Each unit of the battery management system 100 may mutually transmit and receive information to/from a communication terminal 22 used by an administrator 40 of the battery management system 100.

In the present embodiment, details of the battery management system 100 are described in a case where the battery management system 100 provides a sharing service of the mobile battery 122 to the driver 20 of the electric motorbike 110, as an example. However, the service provided by the battery management system 100 is not limited to the sharing service of the mobile battery 122.

In the present embodiment, the battery management system 100 is configured to manage the mobile battery 122 supplying electric power to the electric motorbike 110. The battery management system 100 may manage one or plurality of (which may be referred to as "one or more") mobile batteries 122.

For example, the battery management system 100 manages a particular mobile battery 122 and a particular electric motorbike 110, in association with each other. More specifically, in the present embodiment, the battery management system 100 is configured to allocate identical or corresponding pieces of identification information (which may be referred to as collation ID) to the electric motorbike 110 and mobile battery 122 managed in association with each other (which may be abbreviated as "corresponding").

In one embodiment, identification information A and identification information B are corresponding identification information if the identification information B corresponding to the identification information A can be specified, and the identification information A corresponding to the identification information B can be specified by referring to information indicating the correspondence between the identification information A and the identification information B. In another embodiment, identification information A and identification information B are corresponding identification information if one of the identification information A and the identification information B can be converted to the other of the identification information A and the identification information B based on a predetermined algorithm (which may be referred to as an algorithm for associating collation IDs). For example, if identification information B is data obtained by hashing or encrypting identification information A, the identification information A and the identification information B are the corresponding identification information.

Note that, in the present embodiment, the electric motorbike 110 is configured such that the ID feeding unit 124 configured to store a particular collation ID to feed the collation ID to the electric motorbike 110 can be installed in the electric motorbike 110. The above-mentioned particular collation ID may be a collation ID allocated to the electric motorbike 110 on which the ID feeding unit 124 is mounted, or may be a collation ID allocated to the ID feeding unit 124.

In this case, the battery management system 100 may manage the mobile battery 122 and the ID feeding unit 124 in association with each other. By managing the mobile battery 122 and the ID feeding unit 124 in association with each other, the battery management system 100 can manage the above-mentioned mobile battery 122 and the electric motorbike 110 on which the above-mentioned ID feeding unit 124 is mounted, in association with each other.

The battery management system 100 may manage (i) a single mobile battery 122 and a single electric motorbike 110 in association with each other, may manage (ii) a single mobile battery 122 and a plurality of electric motorbikes 110 in association with each other, may manage (iii) a plurality of mobile batteries 122 and a single electric motorbike 110 in association with each other, or may manage (iv) a plurality of mobile batteries 122 and a plurality of electric motorbikes 110 in association with each other. Note that, this is the same in a case where the battery management system 100 manages the mobile battery 122 and the ID feeding unit 124 in association with each other.

For example, if the battery management system 100 allocates identical collation IDs to an electric motorbike 110 and a mobile battery 122 corresponding to each other, each of the electric motorbike 110 and the mobile battery 122 stores the collation ID in any storage device (not depicted) arranged in each of the electric motorbike 110 and the mobile battery 122. As described above, the collation ID allocated to the electric motorbike 110 may be stored in any storage device (not depicted) arranged in an ID feeding unit 124 mounted on the electric motorbike 110.

For example, if the battery management system 100 allocates a corresponding collation ID to each of the electric motorbike 110 and the mobile battery 122 corresponding to each other, the electric motorbike 110 stores the collation ID allocated to the electric motorbike 110 in any storage device (not depicted) arranged in each of the electric motorbike 110. As described above, the collation ID allocated to the electric motorbike 110 may be stored in any storage device (not depicted) arranged in the ID feeding unit 124 mounted on the electric motorbike 110. Meanwhile, the mobile battery 122 stores the collation ID allocated to the mobile battery 122 in any storage device (not depicted) arranged in the mobile battery 122.

For example, if the battery management system 100 allocates identical collation IDs to the ID feeding unit 124 and the mobile battery 122 corresponding to each other, each of the ID feeding unit 124 and the mobile battery 122 stores the collation ID in any storage device (not depicted) arranged in each of the ID feeding unit 124 and the mobile battery 122. For example, if the battery management system 100 allocates a corresponding collation ID to each of the ID feeding unit 124 and the mobile battery 122 corresponding to each other, the ID feeding unit 124 stores the collation ID allocated to the ID feeding unit 124 in any storage device (not depicted) arranged in the ID feeding unit 124. Meanwhile, the mobile battery 122 stores the collation ID allocated to the mobile battery 122 in any storage device (not depicted) arranged in the mobile battery 122.

As described above, according to the present embodiment, the electric motorbike 110 or ID feeding unit 124 and the mobile battery 122 managed in association with each other hold identical or corresponding collation IDs. Thus, the collation ID stored in the electric motorbike 110 or ID feeding unit 124 and the collation ID stored in the mobile battery 122 can be collated by any computer. Examples of the above-mentioned computer include a computer of the electric motorbike 110, a computer of the mobile battery 122, a computer of the ID feeding unit 124, or the like (none of which are depicted).

In addition, various kinds of processing to manage the mobile battery 122 can be executed by using a collation result obtained by collating the collation ID stored in the electric motorbike 110 or ID feeding unit 124 and the collation ID stored in the mobile battery 122. For example, the battery management system 100 manages power supply from the mobile battery 122 to the electric motorbike 110. Details of the processing using the above-mentioned collation result will be described below.

The battery management system 100 may manage power exchange between the mobile battery 122 and the electric motorbike 110. For example, by managing power provision from the mobile battery 122 to the electric motorbike 110, the battery management system 100 manages the power supply from the mobile battery 122 to the electric motorbike 110.

[Outline of Each Unit Related to the Battery Management System 100]

In the present embodiment, the communication network 10 is configured to convey information. The communication network 10 may be a wired communication transmission path, may be a wireless communication transmission path, or may be a combination of a wireless communication transmission path and a wired communication transmission path. The communication network 10 may include a wireless packet communication network, the Internet, a vehicle-to-vehicle communication network, a vehicle-to-infrastructure communication network, a P2P network, a dedicated line, a VPN, an electrical power line communication line, or the like.

The communication network 10 may also include (i) a mobile communication network such as a mobile phone line network, or may also include (ii) a wireless communication network such as a wireless MAN (for example, WiMAX (registered trademark)), or a near field communication network. Examples of a communication system used for the near field communication network include a wireless LAN (for example, WiFi (registered trademark)), Bluetooth (registered trademark), Zigbee (registered trademark), NFC (Near Field Communication), or the like.

In the present embodiment, the communication terminal 22 is configured to transmit and receive information to/from each unit of the battery management system 100 via the communication network 10. The communication terminal 22 may function as a user interface used when the driver 20 or the administrator 40 accesses the battery management system 100. The communication terminal 22 may be used for user authentication processing performed by the battery management system 100.

Examples of the communication terminal 22 include a personal computer, a mobile terminal, or the like. Examples of the mobile terminal include a mobile phone, a smartphone, a PDA, a tablet, a notebook computer or a laptop computer, a wearable computer, or the like.

In the present embodiment, one or more mobile batteries 122 are mounted on the electric motorbike 110. The electric motorbike 110 consumes electric power supplied from the mobile battery 122 to drive. In the present embodiment, the ID feeding unit 124 is mounted on the electric motorbike 110. The electric motorbike 110 may read out, from a storage device (not depicted) of the ID feeding unit 124, a collation ID stored in the storage device. The electric motorbike 110 may use the collation ID read out from the storage device of the ID feeding unit 124 as its collation ID. Details of the electric motorbike 110 will be described below.

In the present embodiment, the mobile battery 122 is mounted on the electric motorbike 110 and is configured to supply electric power to the electric motorbike 110. The mobile battery 122 may include a storage device for storing the collation ID allocated to the mobile battery 122. The mobile battery 122 may acquire the above-mentioned collation ID from the collation ID writer 140.

The mobile battery 122 may control the power supply from the mobile battery 122 to the electric motorbike 110. The mobile battery 122 may control the power supply from the mobile battery 122 to the electric motorbike 110 based on the collation result obtained by collating the collation ID stored in the electric motorbike 110 or ID feeding unit 124 and the collation ID stored in the mobile battery 122. The mobile battery 122 may acquire (i) the collation ID stored in the electric motorbike 110 or the ID feeding unit 124 to execute the above-mentioned collation processing, or may acquire (ii) information indicating the result of the collation processing executed in an external appliance.

In one embodiment, the mobile battery 122 is configured to determine whether to permit the power supply from the mobile battery 122 to the electric motorbike 110 based on the above-mentioned collation result. In another embodiment, the mobile battery 122 may determine whether it is necessary to limit the power supply from the mobile battery 122 to the electric motorbike 110 based on the above-mentioned collation result.

For example, when the mobile battery 122 mounted on the electric motorbike 110 is not a mobile battery 122 corresponding to the electric motorbike 110, the power supply from the mobile battery 122 to the electric motorbike 110 is prohibited or limited. If the power supply from the mobile battery 122 to the electric motorbike 110 is prohibited or limited, the electric motorbike 110 may not be able to provide performance as rated.

Thus, the driver 20 of the electric motorbike 110 can promptly recognize that the mobile battery 122 mounted on the electric motorbike 110 is not the mobile battery 122 corresponding to the electric motorbike 110. The driver 20 of the electric motorbike 110 replaces the mobile battery 122 mounted on the electric motorbike 110 with the mobile battery 122 corresponding to the electric motorbike 110 so as to cause the performance of the electric motorbike 110 to recover. As a result, a particular mobile battery 122 and a particular electric motorbike 110 can be managed in association with each other.

The management of the mobile battery 122 and the electric motorbike 110 in association with each other enables the battery management system 100, for example, to calculate a usage fee for the sharing service with higher precision. In addition, the algorithm for calculating, by the battery management system 100, the usage fee of the sharing service can be simplified. Further, the battery management system 100 can detect inappropriate use of the mobile battery 122 with higher precision. In addition, the algorithm for detecting, by the battery management system 100, the inappropriate use of the mobile battery 122 can be simplified.

Further, in a case where various kinds of information related to the use status of the electric motorbike 110 are stored in the storage device of the mobile battery 122, the management of the mobile battery 122 and the electric motorbike 110 in association with each other enables the various kinds of information related to the above-mentioned use status of the electric motorbike 110 to be used more effectively. Examples of the use status of the electric motorbike 110 include a travel distance, a history of change in speed, a history of change in acceleration, a history of change in an outside air temperature, a history of change in an internal temperature, or the like.

The mobile battery 122 may be configured to be detachable (which may be referred to as "freely detachable") from the electric motorbike 110. Details of the mobile battery 122 will be described below.

In the present embodiment, the ID feeding unit 124 is configured to store the collation ID allocated to the electric motorbike 110 or ID feeding unit 124 (which may merely be referred to as the collation ID allocated to the electric motorbike 110). The ID feeding unit 124 may acquire the above-mentioned collation ID from the collation ID writer 140. The ID feeding unit 124 is mounted on the electric motorbike 110 and is configured to provide the above-mentioned collation ID to the electric motorbike 110. For example, the ID feeding unit 124 feeds the above-mentioned collation ID to the signal wiring (not depicted) of the electric motorbike 110 at the time of activating the electric motorbike 110. Note that, the timing of feeding the collation ID by the ID feeding unit 124 is not limited to the time of activating the electric motorbike 110.

The ID feeding unit 124 may be configured to be detachable from the electric motorbike 110. Details of the ID feeding unit 124 will be described below.

In the present embodiment, the collation ID writer 140 is configured to write, into the mobile battery 122 and the ID feeding unit 124, their respective collation IDs. In one embodiment, the collation ID writer 140 acquires the collation ID to be written into each of the mobile battery 122 and the ID feeding unit 124 from the administrator 40. In another embodiment, the collation ID writer 140 acquires the collation ID to be written into each of the mobile battery 122 and the ID feeding unit 124 from the management server 180. Details of the collation ID writer 140 will be described below.

For example, when the driver 20 of the electric motorbike 110 applies for use of the sharing service of a mobile battery 122 provided by the battery management system 100, the management server 180 determines a collation ID allocated to the mobile battery 122 to be rented to the driver 20. The management server 180 may determine the collation ID in consideration of a request from the driver 20. For example, the management server 180 acquires information indicating the request from the driver 20 related to the collation ID via the communication terminal 22 used by the driver 20 or the administrator 40. Note that, if the management server 180 allocates the corresponding collation ID to each of the electric motorbike 110 and the mobile battery 122 corresponding to each other, the management server 180 may determine the collation ID allocated to the electric motorbike 110 used by the driver 20 in this stage.

Next, the management server 180 transmits, to the collation ID writer 140, the collation ID allocated to the mobile battery 122. In addition, if the management server 180 allocates the corresponding collation ID to each of the electric motorbike 110 and the mobile battery 122 corresponding to each other, the management server 180 may transmit, to the collation ID writer 140, the collation ID allocated to the electric motorbike 110 used by the driver 20.

Next, the collation ID writer 140 writes the collation ID acquired from the management server 180 into the mobile battery 122 and the ID feeding unit 124. Thus, before the mobile battery 122 and the electric motorbike 110 are electrically connected, respective collation IDs for the mobile battery 122 and the electric motorbike 110 are respectively written into the storage device arranged in the mobile battery 122 and the storage device arranged in the electric motorbike 110. More specifically, after the use of the mobile battery 122 by the driver 20 is permitted and before the mobile battery 122 and the electric motorbike 110 are electrically connected, respective collation IDs for the mobile battery 122 and the electric motorbike 110 are respectively written into the storage device arranged in the mobile battery 122 and the storage device arranged in the electric motorbike 110.

In still another embodiment, the collation ID writer 140 is configured to read the collation ID from the ID feeding unit 124 and write said collation ID into the mobile battery 122. In this case, the management server 180 may manage the collation ID of the mobile battery 122 and/or ID feeding unit 124 and an ID for identifying the driver 20 of the electric motorbike 110 in association with each other.

For example, in the ID feeding unit 124, a collation ID of the ID feeding unit 124 is stored. Then, the collation ID writer 140 reads the collation ID of the ID feeding unit 124 from the ID feeding unit 124 and writes the collation ID as the collation ID of the mobile battery 122 into the mobile battery 122. For example, in the ID feeding unit 124, the collation ID of the ID feeding unit 124 and the collation ID of the mobile battery 122 used in the electric motorbike 110 in which the ID feeding unit 124 is installed are stored. Then, the collation ID writer 140 reads the collation ID of the mobile battery 122 from the ID feeding unit 124 and writes the collation ID into the mobile battery 122.

In the present embodiment, the battery station 160 is configured to be capable of accommodating the plurality of mobile batteries 122. The battery station 160 is configured to receive a used mobile battery 122 from the driver 20 of the electric motorbike 110 (which may be referred to as return) and provide the charged mobile battery 122 to the driver 20 of the electric motorbike 110 (which may be referred to as issue). In addition, the battery station 160 is configured to charge the used mobile battery 122.

When the used mobile battery 122 is returned to the battery station 160, the battery station 160 may read the collation ID of the used mobile battery 122. In addition, the battery station 160 may write the above-mentioned collation ID into the used mobile battery 122 before the charged mobile battery 122 is issued to the driver 20 who has returned the used mobile battery 122. Thus, the collation ID of the mobile battery 122 can be taken over. Details of the battery station 160 will be described below.

In the present embodiment, the management server 180 is configured to manage one or more mobile batteries 122. For example, the management server 180 manages the state of each of one or more mobile batteries 122. The management server 180 may manage the return and issue of each of one or more mobile batteries 122. The management server 180 may manage the collation ID of each of one or more mobile batteries 122.

The management server 180 may manage one or more electric motorbikes 110. For example, the management server 180 manages the collation ID of each of one or more electric motorbikes 110.

The management server 180 may manage one or more battery stations 160. For example, the management server 180 manages the state of each of one or more battery stations 160. The management server 180 may manage at least one of the reception or the issue of the mobile battery 122 by each of one or more battery stations 160. Details of the management server 180 will be described below.

The driver 20 may be an example of the user of the battery management system 100. The administrator 40 may be an example of the user of the battery management system 100. The electric motorbike 110 may be an example of the power consumption device configured to consume electric power. The mobile battery 122 may be an example of the power supply device configured to supply electric power. The electric motorbike 110 may be an example of the control device. The mobile battery 122 may be an example of the control device. The ID feeding unit 124 may be an example of the control device.

The collation ID allocated to the mobile battery 122 may be an example of the first identification information. The collation ID allocated to the electric motorbike 110 or ID feeding unit 124 may be an example of the second identification information. The storage device arranged in the mobile battery 122 may be an example of the first storage device. The storage device arranged in the electric motorbike 110 may be an example of the second storage device. The storage device arranged in the ID feeding unit 124 may be an example of the second storage device.

Example of Another Embodiment

In the present embodiment, details of the battery management system 100 are described in a case where the power consumption device configured to consume electric power is the electric motorbike 110, as an example. However, the power consumption device is not limited to the electric motorbike 110. In another embodiment, the power consumption device may be a mobile body whose power source is an electric motor or may be a stationary power storage device. The power consumption device may be a charging device configured to supply electric power from at least one mobile battery 122 mounted on the power consumption device to another storage battery connected to the power consumption device so as to charge said another storage battery.

Examples of the mobile body can include an automobile, a motorcycle, a standing ride vehicle having a power unit, a marine vessel, a flight vehicle, or the like. Examples of the automobile can include a gasoline-fueled car, a diesel-fueled car, an electric vehicle, a fuel cell vehicle, a hybrid vehicle, a miniature commuter, an electric cart, or the like. Examples of the motorcycle can include a motorbike, a motor trike, an electric bicycle, or the like. Examples of the marine vessel can include a ship, a hovercraft, a water bike, a submarine ship, a submarine boat, a water scooter, or the like. Examples of the flight vehicle can include an airplane, an airship or a balloon, an aerostat, a helicopter, a drone, or the like.

In the present embodiment, the outline of the battery management system 100 is described in a case where the collation ID allocated to the electric motorbike 110 is stored in any storage device (not depicted) arranged in an ID feeding unit 124, as an example. However the battery management system 100 is not limited to the present embodiment. In another embodiment, the collation ID allocated to the ID feeding unit 124 may be stored in any storage device (not depicted) arranged in the ID feeding unit 124.

Thus, the battery management system 100 can manage the electric motorbike 110 on which the ID feeding unit 124 is mounted and the mobile battery 122 in association with each other. For example, even in a case where the electric motorbike 110 does not have a function of receiving the collation ID from the collation ID writer 140, if the above-mentioned ID feeding unit 124 is mounted on the electric motorbike 110, the battery management system 100 can manage the above-mentioned electric motorbike 110 and the mobile battery 122 in association with each other.

In the present embodiment, details of the battery management system 100 are described in a case where the mobile battery 122 controls the power supply from the mobile battery 122 to the electric motorbike 110 so as to limit the function or performance of the electric motorbike 110, as an example. However, the approach of limiting the function or performance of the electric motorbike 110 is not limited to the present embodiment.

In another embodiment, the electric motorbike 110 limits the function or performance of the electric motorbike 110. For example, the electric motorbike 110 determines whether to permit the power supply from the mobile battery 122 to the electric motorbike 110. The electric motorbike 110 may determine whether it is necessary to limit the power supply from the mobile battery 122 to the electric motorbike 110. Electric motorbike 110 may determine whether to permit activating the electric motorbike 110, or may determine whether it is necessary to limit the torque or speed of the electric motorbike 110.

In still another embodiment, the ID feeding unit 124 limits the function or performance of the electric motorbike 110. For example, the ID feeding unit 124 determines whether to permit the power supply from the mobile battery 122 to the electric motorbike 110. The ID feeding unit 124 may determine whether it is necessary to limit the power supply from the mobile battery 122 to the electric motorbike 110. ID feeding unit 124 may determine whether to permit activating the electric motorbike 110, or may determine whether it is necessary to limit the torque or speed of the electric motorbike 110.

In still another embodiment, (i) the electric motorbike 110 or ID feeding unit 124 may determine whether to permit the power exchange between the mobile battery 122 and the electric motorbike 110, and (ii) the mobile battery 122 may control the power exchange based on the above-mentioned determined result. For example, the electric motorbike 110 or ID feeding unit 124 determines whether to permit the power supply from the mobile battery 122 to the electric motorbike 110. The electric motorbike 110 or ID feeding unit 124 outputs a signal indicating whether to permit the power supply into the mobile battery 122. When the mobile battery 122 receives a signal indicating that the power supply is permitted, a power supply circuit of the mobile battery 122 is started, and the state of the mobile battery 122 becomes a state in which electric power can be supplied to the electric motorbike 110, for example. Meanwhile, when the mobile battery 122 receives a signal indicating the power supply is prohibited or limited, the power supply circuit of the mobile battery 122 is started, and the state of the mobile battery 122 becomes a state in which the power supply to the electric motorbike 110 is prohibited or limited, for example.

In the present embodiment, the outline of the battery management system 100 is described in a case where the mobile battery 122 collates the collation ID stored in the electric motorbike 110 or ID feeding unit 124 and the collation ID stored in the mobile battery 122, as an example. However, the battery management system 100 is not limited to the present embodiment. In another embodiment, the electric motorbike 110 may execute the above-mentioned collation processing. In still another embodiment, the ID feeding unit 124 may execute the above-mentioned collation processing.

The electric motorbike 110 or a component installed in the electric motorbike 110 may be an example of the power device. Examples of the component installed in the electric motorbike 110 include an ID feeding unit 124. The power consumption device configured to consume electric power may be an example of the power device. The power device, for example, consumes electric power supplied from the power supply device configured to supply electric power.

The power device, for example, exchanges electric power with the power accumulation device configured to accumulate electric power. Thus, between the power device and the power accumulation device, the power device can provide electric power to the power accumulation device, and/or the power device can receive electric power from the power accumulation device.

In one embodiment, the power device is configured to receive electric power from the power accumulation device. The power device may consume electric power supplied from the power accumulation device. For example, the electric motorbike 110 receives electric power from the mobile battery 122. In addition, the electric motorbike 110 consumes electric power supplied from the mobile battery 122 to travel. The power device may accumulate electric power supplied from the power accumulation device. For example, if electric power is exchanged between two mobile batteries 122, one of the mobile batteries 122 receives electric power from the other of the mobile batteries 122 so as to accumulate the electric power.

In another embodiment, the power device is configured to provide electric power to the power accumulation device. For example, a charging device (not depicted) configured to charge the mobile battery 122 supplies electric power to a mobile battery 122 to be charged. The above-mentioned charging device, for example, supplies the mobile battery 122 to be charged with electric power received from the power system. The above-mentioned charging device may supply the mobile battery 122 to be charged with electric power accumulated in a power storage device different from the mobile battery 122 to be charged. The above-mentioned power storage device may be a mobile battery 122 different from the mobile battery 122 to be charged. The above-mentioned charging device may be an example of the power device.

The mobile battery 122 may be an example of the power accumulation device electrically connected to the power device. In one embodiment, the power accumulation device is configured to supply electric power to the above-mentioned power device. The power accumulation device may be an example of the power supply device configured to supply electric power to the power device or the power consumption device. Other examples of the power supply device include a power generation device configured to generate electric power. In another embodiment, the power accumulation device is configured to receive electric power from the above-mentioned power device.

In the present embodiment, details of the battery management system 100 are described in a case where the electric motorbike 110 is the power device, as an example. However, the power device is not limited to the electric motorbike 110.

In another embodiment, the power device may be the mobile body whose power source is an electric motor or may be the stationary power storage device. The power device may be a charging device configured to supply electric power from at least one mobile battery 122 mounted on the power device to another storage battery connected to the power device so as to charge the another storage battery. The above-mentioned another storage battery may be another mobile battery 122 different from the above-mentioned at least one mobile battery. The power device may be the charging device configured to charge the mobile battery 122.

In the present embodiment, details of the battery management system 100 are described in a case where the mobile battery 122 as an example of the power accumulation device supplies electric power to the electric motorbike 110 as an example of the power device, and the mobile battery 122 controls the power exchange between the mobile battery 122 and the electric motorbike 110, as an example.

Specifically, in the present embodiment, the mobile battery 122 determines whether to permit the power supply from the mobile battery 122 to the electric motorbike 110, or determines whether it is necessary to limit the power supply from the mobile battery 122 to the electric motorbike 110 so that the mobile battery 122 determines to prohibit or limit the power exchange between the mobile battery 122 and the electric motorbike 110 or to permit the power exchange between the mobile battery 122 and the electric motorbike 110. However, the control method of the power exchange between the mobile battery 122 and the electric motorbike 110 in the battery management system 100 is not limited to the present embodiment.

In another embodiment, the power device may supply electric power to the power accumulation device, and the power device or the power accumulation device may control the power exchange between the power accumulation device and the power device. For example, the power device or the power accumulation device determines to prohibit or limit the power exchange between the power accumulation device and the power device so as to control the power exchange between the power accumulation device the power device. For example, the power device or the power accumulation device determines to permit the power exchange between the power accumulation device and the power device so as to control the power exchange between the power accumulation device and the power device. For example, the power device or the power accumulation device determines whether it is necessary to limit the power exchange between the power accumulation device and the power device so as to control the power exchange between the power accumulation device and the power device.

[Specific Configuration of Each Unit of the Battery Management System 100]

Each unit of the battery management system 100 may be implemented by hardware, may be implemented by software, or may be implemented by a combination of hardware and software. Each unit of the battery management system 100 may be at least partially implemented by a single server, or may be implemented by a plurality of servers. Each unit of the battery management system 100 may be at least partially implemented on a virtual server or a cloud system. Each unit of the battery management system 100 may be at least partially implemented by a personal computer or a mobile terminal. Examples of the mobile terminal can include a mobile phone, a smartphone, a PDA, a tablet, a notebook computer or a laptop computer, a wearable computer, or the like. Each unit of the battery management system 100 may store information by using a distributed ledger technology or a distributed network such as a blockchain.

In a case where components constituting the battery management system 100 is at least partially implemented by software, the component implemented by said software may be implemented by activating software or a program that defines the operation related to said component, in an information processing device having a common configuration. The above-mentioned information processing device of the common configuration may include (i) a data processing device having a processor such as a CPU or a GPU, a ROM, a RAM, a communication interface, or the like, (ii) an input device such as a keyboard, a pointing device, a touch panel, a camera, a sound input device, a gesture input device, various sensors, or a GPS receiver, (iii) an output device such as a display device, a sound output device, or a vibration device, and (iv) a storage device (including an external storage device) such as a memory, an HDD, or a SSD.

In the above-mentioned information processing device of common configuration, the above-mentioned data processing device or storage device may store the above-mentioned software or program. The above-mentioned software or program is configured to cause, when executed by a processor, the above-mentioned information processing device to execute operations defined by said software or program. The above-mentioned software or program may also be stored in a non-transitory computer-readable recording medium. The above-mentioned software or program may be a program to cause a computer to function as the battery management system 100 or a part of the battery management system 100. The above-mentioned software or program may be a program to cause a computer to execute information processing in the battery management system 100 or the part of the battery management system 100.

The above-mentioned information processing may be information processing related to a control method for controlling a power supply device configured to supply electric power to a power consumption device configured to consume electric power. The above-mentioned control method includes, for example, acquiring first identification information which is identification information for identifying the power supply device. The above-mentioned control method includes, for example, acquiring second identification information which is identification information for identifying the power consumption device.

In one embodiment, the above-mentioned control method includes determining, when the first identification information acquired in the acquiring of the first identification information and the second identification information acquired in the acquiring of the second identification information do not match, (i) to prohibit or limit power supply from the power supply device to the power consumption device, (ii) to output an identification abnormality signal indicating that the first identification information and the second identification information do not match, or (iii) not to output an identification normality signal indicating that the first identification information and the second identification information have matched. In another embodiment, the above-mentioned control method includes determining, when the first identification information acquired in the acquiring of the first identification information and the second identification information acquired in the acquiring of second identification information match, (iv) to permit power supply from the power supply device to the power consumption device, (v) not to output an identification abnormality signal indicating that the first identification information and the second identification information do not match, or (vi) to output an identification normality signal indicating that the first identification information and the second identification information have matched.

The above-mentioned information processing may be information processing related to a control method for controlling a power accumulation device electrically connected to a power device. The above-mentioned control method includes, for example, acquiring first identification information which is identification information for identifying the power accumulation device. The above-mentioned control method includes, for example, acquiring second identification information which is identification information for identifying the power device.

In one embodiment, the above-mentioned control method includes determining, when the first identification information acquired in the acquiring of the first identification information and the second identification information acquired in the acquiring of the second identification information do not match, (i) to prohibit or limit power exchange between the power accumulation device and the power device, (ii) to output an identification abnormality signal indicating that the first identification information and the second identification information do not match, or (iii) not to output an identification normality signal indicating that the first identification information and the second identification information match. In another embodiment, the above-mentioned control method includes determining, when the first identification information acquired in the acquiring of the first identification information and the second identification information acquired in the acquiring of second identification information match, (iv) to permit power exchange between the power accumulation device and the power device, (v) not to output an identification abnormality signal indicating that the first identification information and the second identification information do not match, or (vi) to output an identification normality signal indicating that the first identification information and the second identification information match.

Figure 2:
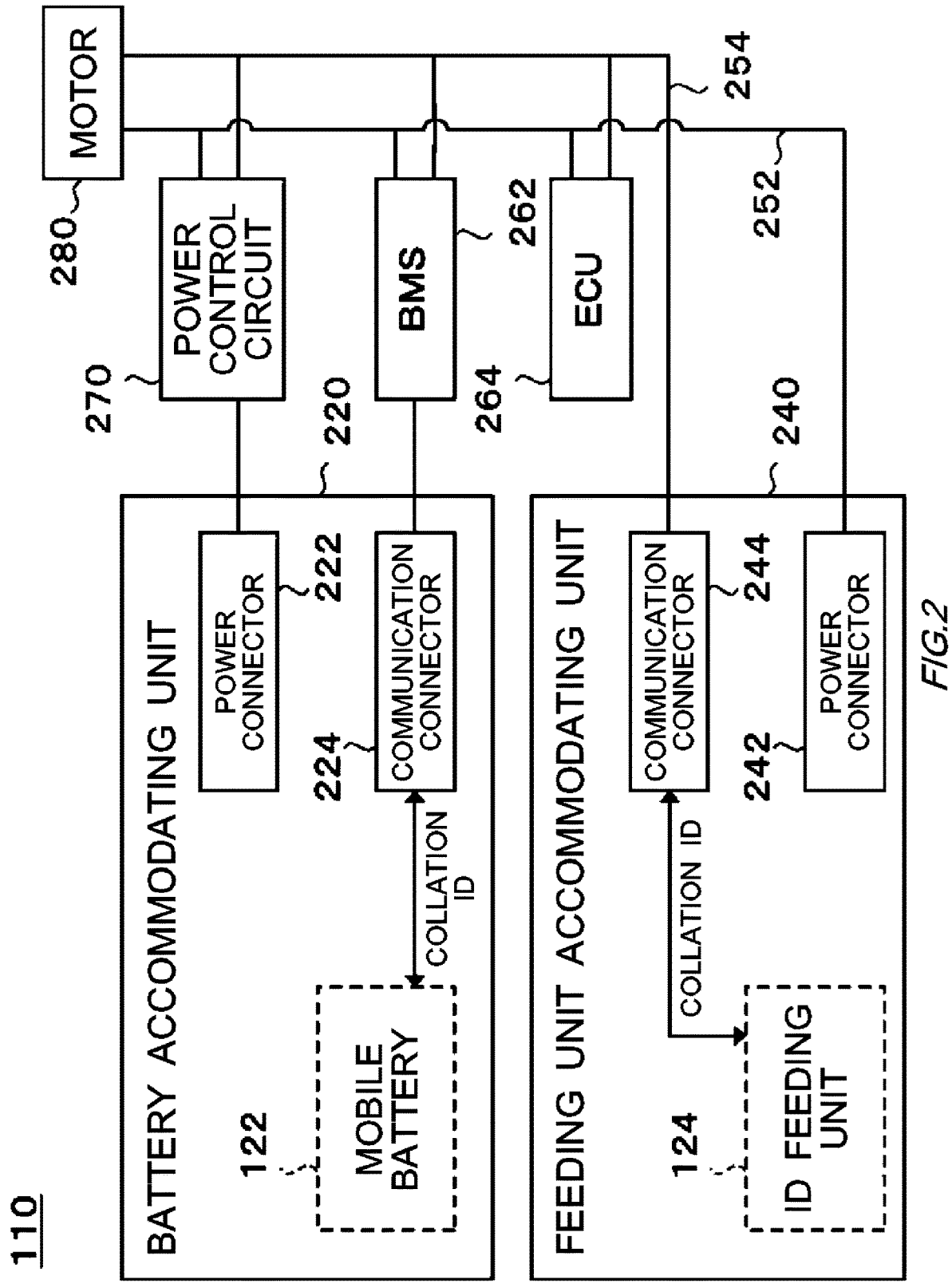
FIG. 2 schematically shows an example of the internal configuration of an electric motorbike 110.

FIG. 2 schematically shows an example of the internal configuration of the electric motorbike 110. In the present embodiment, the electric motorbike 110 includes a battery accommodating unit 220, a power connector 222, a communication connector 224, a feeding unit accommodating unit 240, a power connector 242, a communication connector 244, power wiring 252, signal wiring 254, a BMS 262, an ECU 264, a power control circuit 270, and a motor 280.

In the present embodiment, the battery accommodating unit 220 is configured to accommodate the mobile battery 122. The power connector 222 and the communication connector 224 are arranged inside the battery accommodating unit 220. The battery accommodating unit 220 may be configured to be capable of accommodating a plurality of mobile batteries 122. In this case, the number of the power connectors 222 and the communication connectors 224 arranged inside the battery accommodating unit 220 may correspond to the number of the mobile batteries 122 possible to be accommodated.

In the present embodiment, the power connector 222 is electrically connected to a power connector of the mobile battery 122. The power feeding system between the power connector 222 and the mobile battery 122 may be a wired power feeding system or may be a wireless power feeding system. The power connector 222, for example, receives electric power supplied from the mobile battery 122. The power connector 222 may supply electric power (for example, regenerative electric power) generated in the electric motorbike 110 to the mobile battery 122.

In the present embodiment, the communication connector 224 is communicatively connected to a communication connector of the mobile battery 122. The communication system of the communication connector 224 and the mobile battery 122 may be a wired communication system or may be a wireless communication system. Thus, the collation ID of at least one of the electric motorbike 110 or the mobile battery 122 can be transmitted and received between the electric motorbike 110 and the mobile battery 122. Note that, as described above, the collation ID of the electric motorbike 110 may be the collation ID allocated to the electric motorbike 110 or may be the collation ID allocated to the ID feeding unit 124.

In the present embodiment, the feeding unit accommodating unit 240 is configured to accommodate the ID feeding unit 124. The power connector 242 and the communication connector 244 are arranged inside the ID feeding unit 124.

In the present embodiment, the power connector 242 is electrically connected to the ID feeding unit 124 to supply electric power to the ID feeding unit 124. The power feeding system between the power connector 242 and the ID feeding unit 124 may be a wired power feeding system or may be a wireless power feeding system.

In the present embodiment, the communication connector 244 is communicatively connected to a communication connector of the ID feeding unit 124. The communication system between the communication connector 244 and the ID feeding unit 124 may be a wired communication system or may be a wireless communication system. Thus, each unit of the electric motorbike 110 can acquire the collation ID stored in the ID feeding unit 124.

In the present embodiment, the power wiring 252 is configured to receive electric power from the mobile battery 122 via the power connector 222 and supply the electric power to each unit of the electric motorbike 110. At least one of the electric power, voltage, or current supplied from the power connector 222 to the power wiring 252 may be adjusted by the power control circuit 270. The power wiring 252 may receive regenerative electric power generated in the motor 280 and supply the electric power to the mobile battery 122 via the power connector 222.

In the present embodiment, the signal wiring 254 is configured to convey information between each unit of the electric motorbike 110. The signal wiring 254 may be a wired communication transmission path, may be a wireless communication transmission path, or may be a combination of a wireless communication transmission path and a wired communication transmission path. The signal wiring 254 may receive, via the communication connector 244, data indicating the collation ID fed by the ID feeding unit 124. Thus, for example, at least one of the BMS 262 or the ECU 264 can acquire the above-mentioned collation ID.

In the present embodiment, the BMS 262 may be a battery management system configured to manage the mobile battery 122 mounted on the electric motorbike 110. The BMS 262 may control, via the communication connector 224, the mobile battery 122 connected to the communication connector 224. For example, the BMS 262 may control the mobile battery 122 so as to control the power supply from the mobile battery 122 to the electric motorbike 110. The BMS 262 may transmit, to the mobile battery 122, a control signal for controlling the magnitude of at least one of the output electric power, amount of output electric power, output voltage, or output current of the mobile battery 122. Note that, in another embodiment, the BMS 262 may control the operation of the power control circuit 270 so as to control the power supply from the mobile battery 122 to the electric motorbike 110.

The BMS 262 may monitor, via the communication connector 224, the state of the mobile battery 122 connected to the communication connector 224. For example, the BMS 262 acquires information indicating the state of the above-mentioned mobile battery 122. The BMS 262 may transmit, via the signal wiring 254, information indicating the state of the above-mentioned mobile battery 122 to the ECU 264.

In the present embodiment, the ECU 264 may be an electronic control unit for controlling the operation of the electric motorbike 110. For example, the ECU 264 may control the BMS 262 to control the power supply from the mobile battery 122 to the electric motorbike 110. ECU 264 may control the power control circuit 270 to control the power supply from the mobile battery 122 to the motor 280.

In the present embodiment, the power control circuit 270 is configured to control the power supply from the mobile battery 122 to the power wiring 252. The power control circuit 270 may control, for example, the power supply from the mobile battery 122 to the power wiring 252 based on an instruction from the BMS 262. The power control circuit 270 may control the power supply from the mobile battery 122 to the motor 280. The power control circuit 270 may control, for example, the power supply from the mobile battery 122 to the motor 280 based on an instruction from the ECU 264.

In the present embodiment, the motor 280 is configured to consume electric power supplied from the mobile battery 122 so as to move the electric motorbike 110. The motor 280 may be an example of the power consumption device.

Example of Another Embodiment

In the present embodiment, details of an example of the electric motorbike 110 are described in a case where the electric motorbike 110 includes the BMS 262, the ECU 264, and the power control circuit 270 separately, as an example. However, the electric motorbike 110 is not limited to the present embodiment. In another embodiment, at least two of the BMS 262, the ECU 264, and the power control circuit 270 may be manufactured as one.

Figure 3:
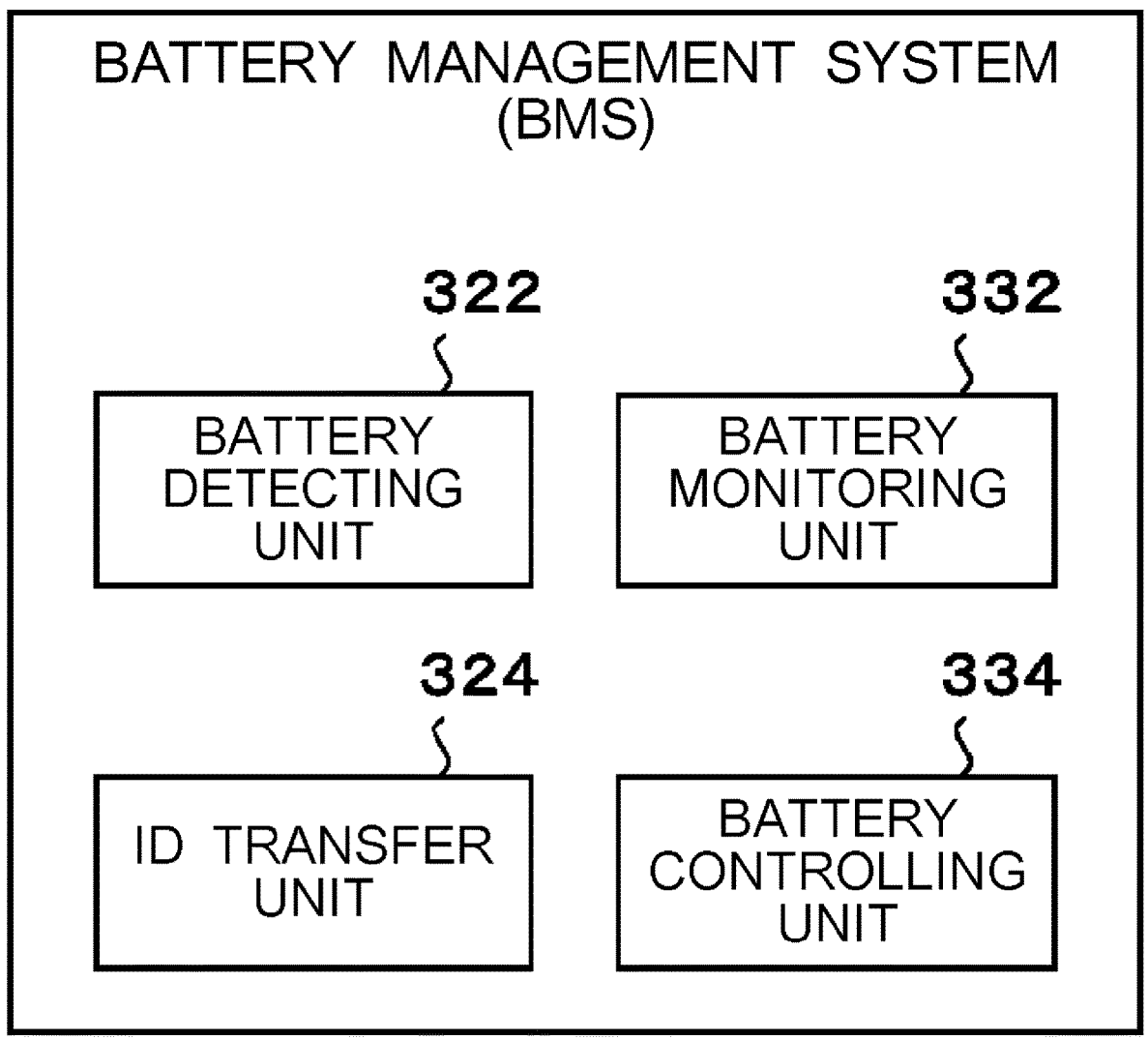
FIG. 3 schematically shows an example of the internal configuration of a BMS 262.

FIG. 3 schematically shows an example of the internal configuration of the BMS 262. In the present embodiment, the BMS 262 includes a battery detecting unit 322, an ID transfer unit 324, a battery monitoring unit 332, and a battery controlling unit 334.

In the present embodiment, the battery detecting unit 322 is configured to detect that the mobile battery 122 and the electric motorbike 110 have been electrically connected. For example, the battery detecting unit 322 detects that the mobile battery 122 and the power connector 222 have been electrically connected.

In the present embodiment, the ID transfer unit 324 is configured to acquire the collation ID fed to the signal wiring 254 by the ID feeding unit 124. The ID transfer unit 324 is configured to transfer the collation ID of the ID feeding unit 124 to the mobile battery 122. Note that, in another embodiment, the ID transfer unit 324 is configured to acquire the collation ID of the mobile battery 122 from the mobile battery 122. The ID feeding unit 124 is configured to transfer the collation ID of the mobile battery 122 to the ECU 264 or the ID feeding unit 124.

In the present embodiment, the battery monitoring unit 332 is configured to monitor the state of the mobile battery 122. For example, the battery monitoring unit 332 acquires various kinds of information indicating the state of the mobile battery 122 from the mobile battery 122. Examples of the state of the mobile battery 122 include the energizing current, charging rate, or deterioration rate of the mobile battery 122, the voltage or temperature of each of a plurality of cells included in the mobile battery 122, or the like.

The battery monitoring unit 332 may acquire information indicating the voltage of the entire mobile battery 122 as the state of the mobile battery 122. The battery monitoring unit 332 may acquire information indicating whether there exists an error detected by the mobile battery 122 as the state of the mobile battery 122. The battery monitoring unit 332 may acquire information indicating the content of the error detected by the mobile battery 122 as the state of the mobile battery 122.

In the present embodiment, the battery controlling unit 334 is configured to control the mobile battery 122. For example, the battery controlling unit 334 controls the mobile battery 122 so as to control the power supply from the mobile battery 122 to the electric motorbike 110. The battery controlling unit 334 may transmit, to the mobile battery 122, a control signal for controlling the magnitude of at least one of the output electric power, amount of output electric power, output voltage, or output current of the mobile battery 122.

Figure 4:
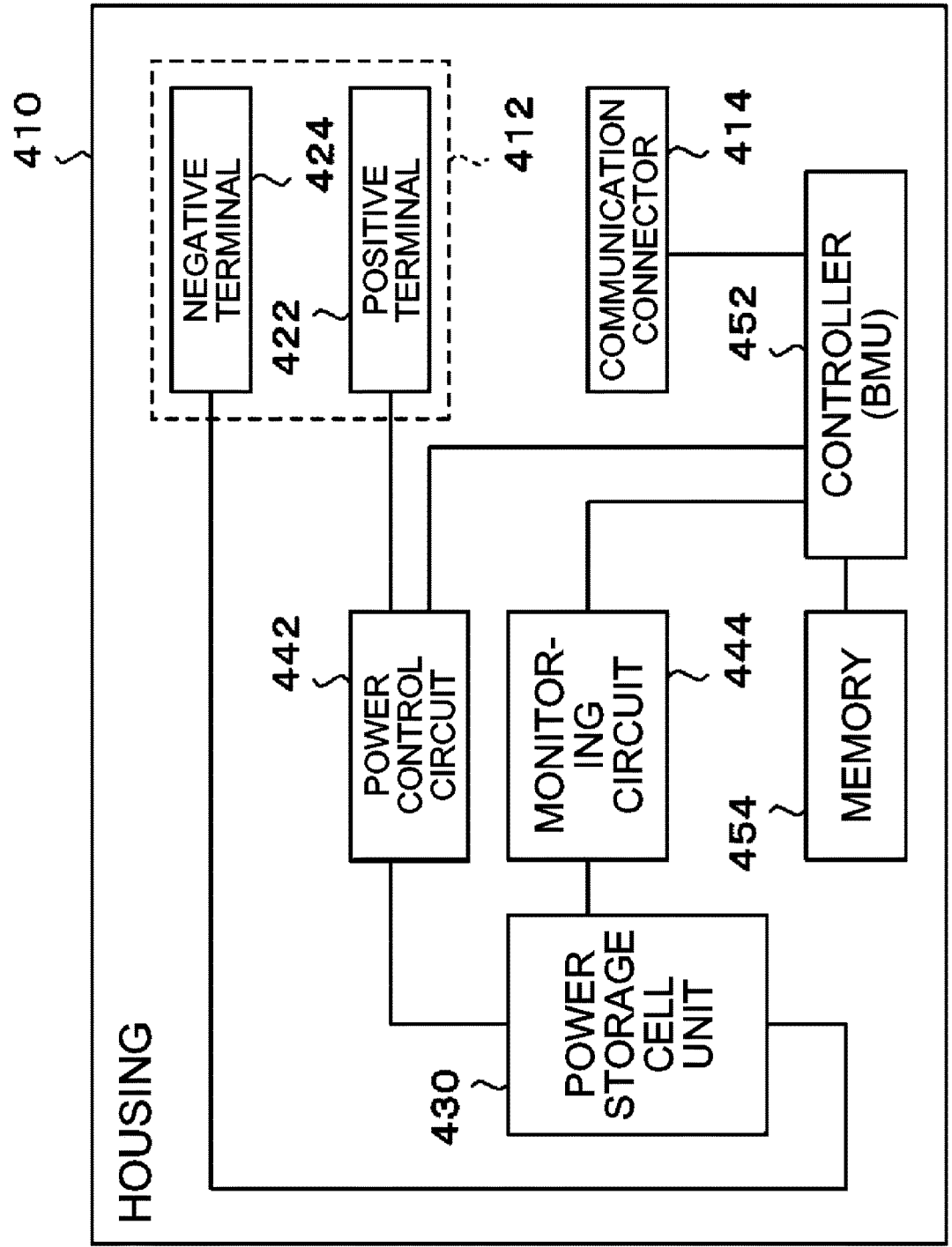
FIG. 4 schematically shows an example of the internal configuration of a mobile battery 122.

FIG. 4 schematically shows an example of the internal configuration of the mobile battery 122. In the present embodiment, the mobile battery 122 includes a housing 410, and a power connector 412 and a communication connector 414 arranged in the housing 410. The power connector 412 may have a positive terminal 422 and a negative terminal 424. In the present embodiment, a power storage cell 430, a power control circuit 442, a monitoring circuit 444, a controller 452, and a memory 454 are arranged inside the housing 410.

In the present embodiment, the housing 410 is configured to accommodate each unit of the mobile battery 122. In the present embodiment, the power connector 412 is electrically connected to the power connector 222 of the electric motorbike 110. The positive terminal 422 is electrically connected to the positive electrode of the power storage cell 430. The negative terminal 424 is electrically connected to the negative electrode of the power storage cell 430. In the present embodiment, the communication connector 414 is communicatively connected to the communication connector 224 of the electric motorbike 110.

As described above, the mobile battery 122 can be accommodated in the battery station 160. In a case where the mobile battery 122 is accommodated in the battery station 160, the power connector 412 may be electrically connected to the power connector of the battery station 160. The communication connector 414 may be communicatively connected to the communication connector of the battery station 160. In this case, the power feeding system may be a wired power feeding system or may be a wireless power feeding system. In addition, the communication system may be a wired communication system or may be a wireless communication system.

In the present embodiment, the power storage cell 430 is configured to accumulate electrical energy. The power storage cell 430 may include a plurality of power storage cells. At least some of the plurality of power storage cells may be connected in series.

In the present embodiment, the power control circuit 442 is configured to control the power supply from the mobile battery 122 to the outside. The power control circuit 442 may control the power supply from the mobile battery 122 to the outside in accordance with an instruction from the controller 452.

The power control circuit 442 may include various elements, such as a relay, a switch, a resistor, a variable resistor, a coil, and a capacitor. The power control circuit 442 may include a DC/DC converter. The DC/DC converter may be a unidirectional DC/DC converter or may be a bi-directional DC/DC converter.

In one embodiment, if the controller 452 has determined to prohibit the power supply from the mobile battery 122 to the electric motorbike 110, the power control circuit 442 stops power supply from the power storage cell 430 to the power connector 412. For example, the power control circuit 442 stops the power supply from the power storage cell 430 to the power connector 412 by opening the relay or switch included in the power control circuit 442.

If the controller 452 has determined to prohibit the power supply from the mobile battery 122 to the electric motorbike 110, the controller 452 may feed, via the communication connector 414, a command for stopping the use of the electric power in the electric motorbike 110 to the BMS 262, ECU 264, or power control circuit 270 of the electric motorbike 110. Thus, the electric motorbike 110 stops the use of electric power. As a result, the power supply from the mobile battery 122 to the electric motorbike 110 is prohibited. The procedure through which the electric motorbike 110 stops the use of electric power may be determined in consideration of safety.

In another embodiment, if the controller 452 has determined to limit the power supply from the mobile battery 122 to the electric motorbike 110, the power control circuit 442 reduces the power supply amount from the power storage cell 430 to the power connector 412. For example, the power control circuit 442 controls the variable resistor or the DC/DC converter of the power control circuit 442 so as to reduce the power supply amount from the power storage cell 430 to the power connector 412.

If the controller 452 has determined to limit the power supply from the mobile battery 122 to the electric motorbike 110, the controller 452 may feed, via the communication connector 414, a command for reducing the usage of the electric power in the electric motorbike 110 to the BMS 262, ECU 264, or power control circuit 270 of the electric motorbike 110. Thus, the power usage of the electric motorbike 110 is reduced. As a result, the power supply from the mobile battery 122 to the electric motorbike 110 is limited. The procedure for reducing the power usage of the electric motorbike 110 may be determined in consideration of safety.

In another embodiment, if the controller 452 has determined to permit the power supply from the mobile battery 122 to the electric motorbike 110, the power control circuit 442 begins the power supply from the power storage cell 430 to the power connector 412. For example, the power control circuit 442 closes the relay or switch included in the power control circuit 442 so as to begin the power supply from the power storage cell 430 to the power connector 412.

If the controller 452 has determined to permit the power supply from the mobile battery 122 to the electric motorbike 110, the controller 452 may feed, via the communication connector 414, a command for beginning or resuming the use of electric power in the electric motorbike 110 to the BMS 262, ECU 264, or power control circuit 270 of the electric motorbike 110. The electric motorbike 110 begins or resumes the use of electric power. As a result, the power supply from the mobile battery 122 to the electric motorbike 110 is permitted. The procedure through which the electric motorbike 110 begins or resumes the use of electric power may be determined in consideration of safety.

The power control circuit 442 may include various protection circuits for preventing the power storage cell 430 from being damaged. Examples of the above-mentioned protection circuit include an overcharge protection circuit, an over-discharge protection circuit, an overcurrent protection circuit, or the like.

Note that, in the present embodiment, the power control circuit 442 is arranged between the positive electrode of the power storage cell 430 and the positive terminal 422. However, the power control circuit 442 is not limited to the present embodiment. In another embodiment, the power control circuit 442 may be arranged between the negative electrode of the power storage cell 430 and the negative terminal 424.

In the present embodiment, the monitoring circuit 444 is configured to monitor the state of the power storage cell 430. Examples of the state of the power storage cell 430 include the output voltage, output current, charging rate, or deterioration rate of the power storage cell 430, the voltage or temperature of each of the plurality of power storage cells constituting the power storage cell 430, or the like. The monitoring circuit 444 may transmit information indicating the state of the power storage cell 430 to the controller 452.

The monitoring circuit 444 may detect that the electric motorbike 110 and the mobile battery 122 have been electrically connected. The monitoring circuit 444 may transmit, to the controller 452, a signal indicating that the electric motorbike 110 and the mobile battery 122 have been electrically connected.

In the present embodiment, the controller 452 is a BMU (Battery Management Unit) configured to manage the mobile battery 122. For example, the controller 452 manages the collation ID allocated to the mobile battery 122. More specifically, the controller 452 acquires the collation ID allocated to the mobile battery 122 from the collation ID writer 140 or the battery station 160. The controller 452 stores the above-mentioned collation ID in the memory 454.

The controller 452 may control the operation of the mobile battery 122. For example, the controller 452 controls the charge and discharge of the power storage cell 430. More specifically, the controller 452 collates the collation ID stored in the electric motorbike 110 or the ID feeding unit 124 and the collation ID stored in the mobile battery 122. The controller 452 may control the charge and discharge of the power storage cell 430 based on the result of the above-mentioned collation processing.

In one embodiment, the controller 452 is configured to control the power control circuit 442 so as to control the charge and discharge of the power storage cell 430. In another embodiment, the controller 452 is configured to transmit information indicating the result of the above-mentioned collation processing to the electric motorbike 110. The charge and discharge of the power storage cell 430 can be controlled by the control of the power control circuit 270 by the BMS 262 or ECU 264 of the electric motorbike 110 based on information from the controller 452. Details of the controller 452 will be described below.

In the present embodiment, the memory 454 is configured to store the collation ID allocated to the mobile battery 122. When the controller 452 receives an erase instruction from the battery station 160, the collation ID stored in the memory 454 may be erased.

The power storage cell 430 may be an example of the power storage unit. The controller 452 may be an example of the control device. The memory 454 may be an example of the first storage device.

Figure 5:
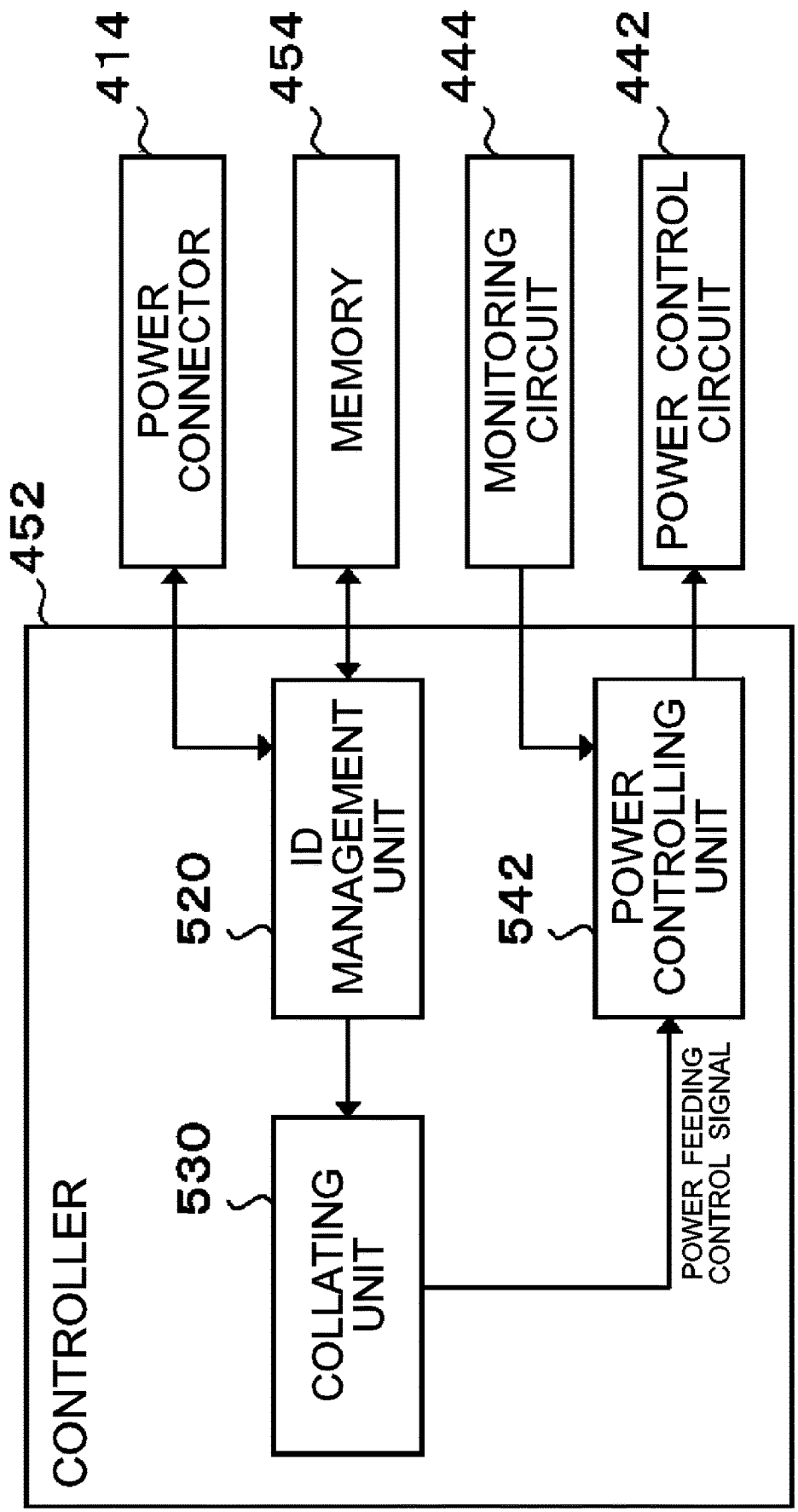
FIG. 5 schematically shows an example of the internal configuration of a controller 452.

FIG. 5 schematically shows an example of the internal configuration of the controller 452. In the present embodiment, the controller 452 includes an ID management unit 520, a collating unit 530, and an power controlling unit 542.

In the present embodiment, the ID management unit 520 is configured to manage the collation ID. For example, the ID management unit 520 acquires, via the communication connector 414, the collation ID from the outside of the mobile battery 122. The above-mentioned collation ID may be the collation ID allocated to the mobile battery 122, or may be a collation ID allocated to the electric motorbike 110 or the ID feeding unit 124.

For example, the ID management unit 520 acquires the collation ID allocated to the mobile battery 122. The collation ID allocated to the mobile battery 122 may be identical to the collation ID allocated to the electric motorbike 110 or the ID feeding unit 124.

In one embodiment, the ID management unit 520 writes the above-mentioned collation ID into the memory 454. In response to a request from the collating unit 530, the ID management unit 520 reads out the collation ID stored in the memory 454 and outputs the read out collation ID to the collating unit 530. In another embodiment, the ID management unit 520 outputs the above-mentioned collation ID to the collating unit 530 without writing the collation ID into the memory 454.

The ID management unit 520 may manage the collation ID allocated to the mobile battery 122. For example, if the mobile battery 122 is communicatively connected to the collation ID writer 140 or the battery station 160, the ID management unit 520 acquires, via the communication connector 414, information indicating the collation ID allocated to the mobile battery 122 from the collation ID writer 140 or the battery station 160. The ID management unit 520 writes the above-mentioned information into the memory 454.

The ID management unit 520 may manage the collation ID allocated to the electric motorbike 110 or the ID feeding unit 124. For example, if the mobile battery 122 is communicatively connected to the electric motorbike 110, the ID management unit 520 acquires, via the communication connector 414, the information indicating the collation ID allocated to the electric motorbike 110 or the ID feeding unit 124 from the electric motorbike 110 or the ID feeding unit 124. The ID management unit 520 writes the above-mentioned information into the memory 454.

The ID management unit 520 may output, via the communication connector 414, the collation ID stored in the memory 454 to the outside of the mobile battery 122. For example, in response to a request from the electric motorbike 110 or the battery station 160, the ID management unit 520 reads out the collation ID stored in the memory 454 and outputs the read out collation ID to the requestor of the above-mentioned request.

The ID management unit 520 may erase the collation ID allocated to the mobile battery 122. For example, in response to a request from the battery station 160, the ID management unit 520 erases the collation ID stored in the memory 454.

The ID management unit 520 may manage the information indicating the correspondence between the collation ID allocated to the mobile battery 122 and the collation ID allocated to the electric motorbike 110 or the ID feeding unit 124. The above-mentioned information indicating the correspondence may be (i) information indicating the collation ID allocated to the electric motorbike 110 or the ID feeding unit 124 associated with the collation ID allocated to the mobile battery 122, or may be (ii) information for specifying an algorithm to associate the above-described collation ID.

The ID management unit 520 acquires the above-mentioned information indicating the correspondence, for example, from the collation ID writer 140 or the battery station 160. The ID management unit 520 may write the above-mentioned information into the memory 454. In response to a request from the collating unit 530, the ID management unit 520 may read out the above-mentioned information indicating the correspondence stored in the memory 454 and output the read out information to the collating unit 530. Note that, in response to a request from the electric motorbike 110 or the battery station 160, the ID management unit 520 may read out the above-mentioned information indicating the correspondence stored in the memory 454 and output the read out information to the requestor of the above-mentioned request.

Note that, the ID management unit 520 may not execute at least a part of the above-described information processing. For example, the ID management unit 520 may not write the information indicating the collation ID allocated to the electric motorbike 110 or the ID feeding unit 124 into the memory 454. Also, the ID management unit 520 may not write the above-mentioned information indicating the correspondence into the memory 454.

[Outline of Collation Processing]

In the present embodiment, the collating unit 530 is configured to collate the collation ID allocated to the mobile battery 122 and the collation ID allocated to the electric motorbike 110 or the ID feeding unit 124. The collating unit 530 transmits information indicating the collation result to the power controlling unit 542. Examples of the information indicating the collation result can include a signal indicating that the two match (which may be referred to as a matching signal), a signal indicating that the two do not match (which may be referred to as a mismatching signal), a signal for controlling the power feeding from the mobile battery 122 to the electric motorbike 110 (which may be referred to as a power feeding control signal), or the like.

Note that, as described above, in the present embodiment, identical or corresponding pieces of identification information are used as collation IDs. Therefore, when the collation ID allocated to the mobile battery 122 is identical or corresponding to the collation ID allocated to the electric motorbike 110 or the ID feeding unit 124, the collating unit 530 may judge that the two match.

In addition, a case where the collating unit 530 cannot acquire at least one of the collation ID allocated to the mobile battery 122, or the collation ID allocated to the electric motorbike 110 or the ID feeding unit 124 is also conceivable. In this case, the collating unit 530 cannot collate the two directly. However, when the collating unit 530 cannot acquire at least one of the collation ID allocated to the mobile battery 122, or the collation ID allocated to the electric motorbike 110 or the ID feeding unit 124, the collating unit 530 may judge that the two do not match.

For example, if the collating unit 530 could not acquire at least one of the collation ID allocated to the mobile battery 122, or the collation ID allocated to the electric motorbike 110 or the ID feeding unit 124 in a predetermined period, the collating unit 530 may judge that the collating unit 530 cannot acquire the above-mentioned collation ID. Examples of the predetermined period include (i) a period until a predetermined time elapses after the mobile battery 122 is mounted on the electric motorbike 110, (ii) a period until a predetermined time elapses after the electric motorbike 110 is activated, (iii) a period until a predetermined time elapses after collation processing is begun, (iv) a period until a predetermined time elapses after acquiring processing of the collation ID is begun, or the like.

Specific Example of when Collating Unit 530 Cannot Acquire Collation ID

For example, a collation ID allocated by the battery management system 100 is not stored in the electric motorbike 110 not under the control of the battery management system 100. In addition, the electric motorbike 110 not under the control of the battery management system 100 may not have a function of communicating with the mobile battery 122. In such a case, even if the mobile battery 122 is mounted on the electric motorbike 110 not under the control of the battery management system 100, the collating unit 530 cannot acquire the collation ID allocated to the above-mentioned electric motorbike 110.

In addition, in a case where the battery station 160 is jointly used by an operational company operating a sharing service by the battery management system 100 and another operational company operating a similar sharing service, it is possible that the collation ID allocated by the battery management system 100 is not stored in the mobile battery 122 managed by the above-mentioned another operational company. In the same way, for example, in a case where the battery station 160 used for the sharing service by the battery management system 100 is also used to provide the charging service of any mobile battery 122, it is possible that a single battery station 160 accommodates the mobile battery 122 under the control of the operational company of the sharing service and the mobile battery 122 not under the control of the operational company of the sharing service.

In this way, the mobile battery 122 in which the collation ID allocated by the battery management system 100 is stored and the mobile battery 122 in which the collation ID allocated by the battery management system 100 is not stored can coexist and be in circulation. In such a case, even if the mobile battery 122 not under the control of the battery management system 100 is mounted on the electric motorbike 110, the collating unit 530 cannot acquire the collation ID allocated to the above-mentioned mobile battery 122.

Specific Example of Collation Processing

More specifically, first, the collating unit 530 acquires the collation ID allocated to the mobile battery 122 and the collation ID allocated to the electric motorbike 110 or the ID feeding unit 124. The collation ID allocated to the mobile battery 122 is stored, for example, in the memory 454 of the mobile battery 122. The collation ID allocated to the electric motorbike 110 or the ID feeding unit 124 is stored, for example, in a storage device arranged in the electric motorbike 110 or the ID feeding unit 124.

Then, for example, the collating unit 530 acquires the collation ID allocated to the mobile battery 122 by referring to the memory 454. If the memory 454 stores a single collation ID, the collating unit 530 may acquire the collation ID stored in the memory 454 as the collation ID allocated to the mobile battery 122.

In addition, for example, the collating unit 530 acquires the collation ID allocated to the electric motorbike 110 or the ID feeding unit 124 by referring to the storage device arranged in the electric motorbike 110 or the ID feeding unit 124. If the above-mentioned storage device stores a single collation ID, the collating unit 530 may acquire the collation ID stored in the above-mentioned storage device as the collation ID allocated to the electric motorbike 110 or the ID feeding unit 124.

For example, when it is detected that the electric motorbike 110 and the mobile battery 122 have been electrically connected, the collating unit 530 acquires at least one of the collation ID allocated to the mobile battery 122, or the collation ID allocated to the electric motorbike 110 or the ID feeding unit 124.

In one embodiment, when the battery detecting unit 322 of the electric motorbike 110 detects that the electric motorbike 110 and the mobile battery 122 have been electrically connected, the ID transfer unit 324 of the electric motorbike 110 transmits the collation ID allocated to the electric motorbike 110 or the ID feeding unit 124 to the controller 452. In another embodiment, when the monitoring circuit 444 detects that the electric motorbike 110 and the mobile battery 122 are electrically connected, the ID management unit 520 reads out the collation ID allocated to the mobile battery 122 from the memory 454.

Note that, the timing of executing the acquiring processing of the above-mentioned collation ID is not limited to the present embodiment. In another embodiment, the acquiring processing of the collation ID may be executed during activating sequence of the electric motorbike 110, or may be executed at any timing after activating the electric motorbike 110.

Next, the collating unit 530 compares the collation ID allocated to the mobile battery 122 and the collation ID allocated to the electric motorbike 110 or the ID feeding unit 124. When the two do not match, the collating unit 530 determines (i) to prohibit or limit power supply from the mobile battery 122 to the electric motorbike 110, (ii) to output the mismatching signal, or (iii) not to output the matching signal. Meanwhile, when the two match, the collating unit 530 determines (iv) to permit the power supply from the mobile battery 122 to the electric motorbike 110, (v) not to output the mismatching signal, or (vi) to output the matching signal.

[Exceptional Processing]

Even when the two do not match, the collating unit 530 may exceptionally determine matters of the above-mentioned (iv), (v). or (vi). Also, even when the two match, the collating unit 530 may exceptionally determine the matters of the above-mentioned (i), (ii), or (iii).

According to one embodiment, even when the two do not match, if (a) the collation ID allocated to the mobile battery 122 meets a first condition, and (b) the collating unit 530 could not acquire the collation ID allocated to the electric motorbike 110 or the ID feeding unit 124 in a predetermined period, the collating unit 530 may determine the matters of the above-mentioned (iv), (v), or (vi).

Examples of the first condition include a condition that the collation ID allocated to the mobile battery 122 is a predetermined value or symbol, a condition that the collation ID allocated to the mobile battery 122 includes a predetermined value or symbol, or the like. The predetermined value or symbol may be a character string or may be a numerical value.

The predetermined value or symbol may be an initial value allocated to the mobile battery 122 when the mobile battery 122 is manufactured or sold. The above-mentioned predetermined value or symbol may be a value or symbol indicating a state of being under the control of the battery management system 100. The above-mentioned predetermined value or symbol may be a value or symbol indicating a state of not being under the control of the battery management system 100. The predetermined value or symbol may be data indicating that a collation ID is not stored.

For example, different initial values are allocated to each mobile battery 122. To each of one or more mobile batteries 122, an initial value selected from a predetermined one or plurality of initial values may be allocated. An initial value allocated to each manufacturer or seller of the mobile battery 122 may be used. An initial value allocated to each model of the mobile battery 122 may be used.

The collating unit 530 may acquire, from an external appliance (for example, the management server 180), a list of a value or symbol used as the initial value of the mobile battery 122. The collating unit 530 may acquire, from an external appliance, information indicating a value or symbol indicating the state of being under the control of the battery management system 100. The collating unit 530 may acquire, from an external appliance, a list of the identification information of the mobile battery 122 under control of the battery management system 100. Thus, the collating unit 530 can judge whether the collation ID allocated to the mobile battery 122 is the predetermined value or symbol.

In another embodiment, if (a) the collation ID allocated to the mobile battery 122 meets a first condition, and (c) the collating unit 530 was able to acquire a collation ID allocated to the electric motorbike 110 or the ID feeding unit 124 in a predetermined period, the collating unit 530 may determine, regardless of whether the two match, the matters of the above-mentioned (i), (ii), or (iii).

In another embodiment, if (d) the collation ID allocated to the mobile battery 122 does not meet the first condition, and (b) the collating unit 530 could not acquire the collation ID allocated to the electric motorbike 110 or the ID feeding unit 124 in a predetermined period, the collating unit 530 may determine, regardless of whether the two match, the matters of the above-mentioned (i), (ii), or (iii).

In still another embodiment, even when the two match, if (a) the collation ID allocated to the mobile battery 122 meets the first condition, and (c) the collating unit 530 was able to acquire the collation ID allocated to the electric motorbike 110 or the ID feeding unit 124 in a predetermined period, the matters of the above-mentioned (i), (ii), or (iii) may be determined.

The collating unit 530 may output various signals based on the above-mentioned collation result. For example, when the two match, the collating unit 530 outputs the matching signal. In this case, the collating unit 530 may output a power feeding control signal indicating the permission of the power supply from the mobile battery 122 to the electric motorbike 110. Meanwhile, when the two do not match, the collating unit 530 outputs the mismatching signal. The collating unit 530 may output a power feeding control signal indicating the prohibition or limitation of the power supply from the mobile battery 122 to the electric motorbike 110.

In the present embodiment, the power controlling unit 542 acquires, from the collating unit 530, information indicating the collation result. The power controlling unit 542 controls the power supply from the mobile battery 122 to the electric motorbike 110 based on the collation result of the collating unit 530. The power controlling unit 542 control, for example, the power control circuit 442 so as to control the power supply from the mobile battery 122 to the electric motorbike 110. The power controlling unit 542 may control the power control circuit 270 via the BMS 262 so as to control the power supply from the mobile battery 122 to the electric motorbike 110.

When the power controlling unit 542 received a matching signal from the collating unit 530, the power controlling unit 542 begins the power supply from the mobile battery 122 to the electric motorbike 110 by controlling the power control circuit 442. The power controlling unit 542 may perform in the same way when the power controlling unit 542 received, from the collating unit 530, the power feeding control signal indicating the permission of the power supply from the mobile battery 122 to the electric motorbike 110.

Meanwhile, when the power controlling unit 542 received the mismatching signal from the collating unit 530, the power controlling unit 542 controls the power control circuit 442 so as to stop the power supply from the mobile battery 122 to the electric motorbike 110 or to reduce the supplied electric power or power amount. The power controlling unit 542 may perform in the same way when the power controlling unit 542 received, from the collating unit 530, a power feeding control signal indicating the prohibition or limitation of the power supply from the mobile battery 122 to the electric motorbike 110.

The ID management unit 520 may be an example of the first identification information acquiring unit or the second identification information acquiring unit. The collating unit 530 may be an example of the control device. The mismatching signal may be an example of the identification abnormality signal. The matching signal may be an example of the identification normality signal.

Example of Another Embodiment

In the present embodiment, details of an example of the controller 452 are described in a case where when the monitoring circuit 444 detects that the electric motorbike 110 and the mobile battery 122 have been electrically connected, the ID management unit 520 of the controller 452 reads out the collation ID allocated to the mobile battery 122 from the memory 454, as an example. However, the controller 452 is not limited to the present embodiment.

In another embodiment, when the monitoring circuit 444 detects that the electric motorbike 110 and the mobile battery 122 have been electrically connected, the ID management unit 520 of the controller 452 may acquire, from the storage device arranged in the ID feeding unit 124, the collation ID stored in said storage device. The ID management unit 520 may write the collation ID stored in the ID feeding unit 124 into the memory 454 of the mobile battery 122. In addition, the ID management unit 520 may execute the processing of transmitting, to the management server 180, the collation ID written into the memory 454 of the mobile battery 122. For example, to an appliance having a communication function (for example, the electric motorbike 110, the mobile battery 122, the ID feeding unit 124, the communication terminal 22 of the driver 20, or the like), the ID management unit 520 feeds a command for transmitting the above-mentioned collation ID to the management server 180.

In the present embodiment, details of the battery management system 100 are described in a case where the controller 452 of the mobile battery 122 executes the above-mentioned collation processing, as an example. However, the battery management system 100 is not limited to the present embodiment.

In another embodiment, the battery station 160 may execute the information processing same as the collation processing in the controller 452. In this case, the battery station 160 is configured communicatively to the electric motorbike 110 and/or the ID feeding unit 124. In addition, the battery station 160 is configured to be able to communicate with the mobile battery 122. The battery station 160 may transmit, to the management server 180, the information indicating the collation result, the information acquired by the battery station 160 from the electric motorbike 110 or the ID feeding unit 124, and/or the information acquired by the battery station 160 from the mobile battery 122.

Figure 6:
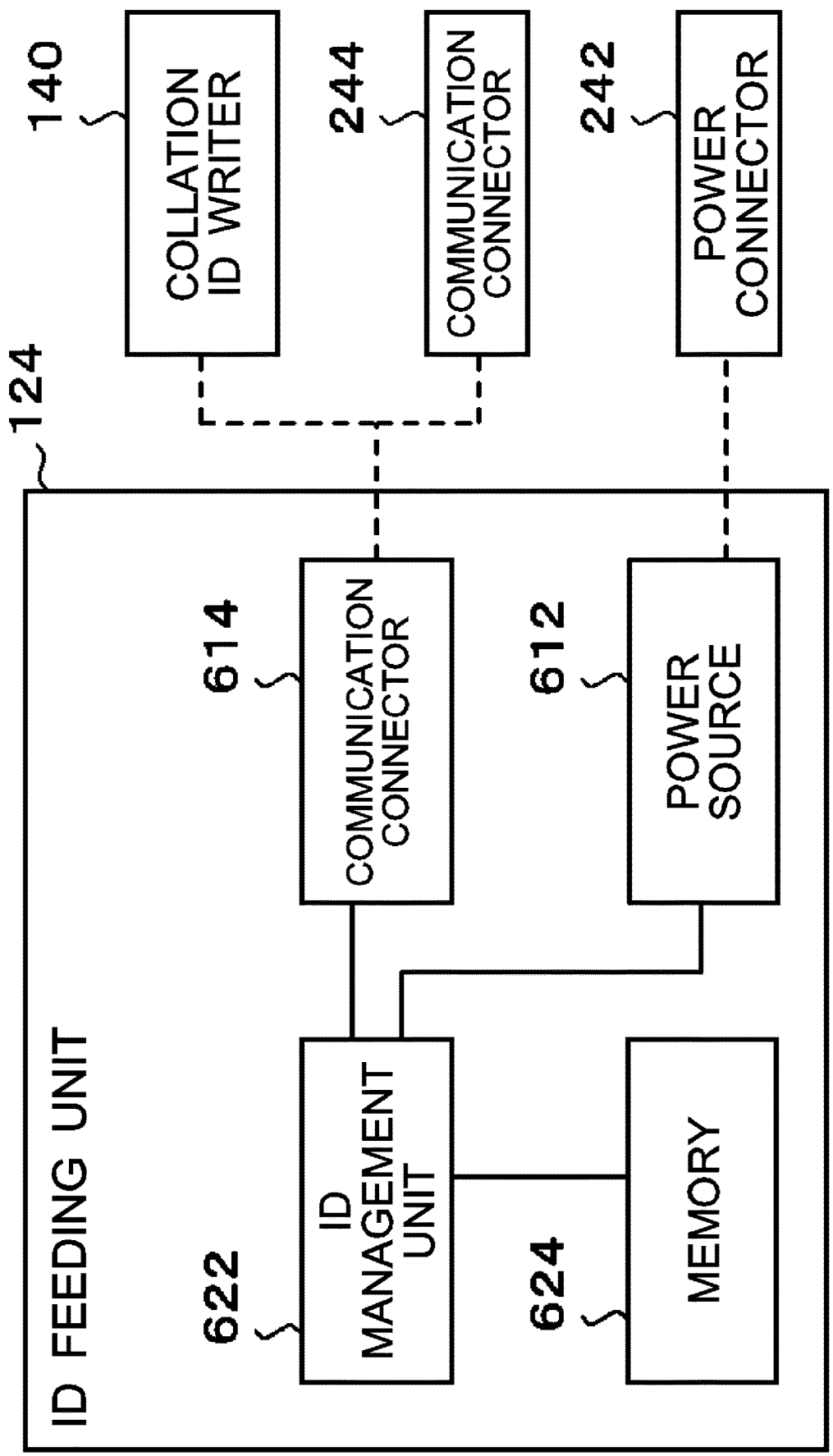
FIG. 6 schematically shows an example of the internal configuration of an ID feeding unit 124.

FIG. 6 schematically shows an example of the internal configuration of the ID feeding unit 124. In the present embodiment, the ID feeding unit 124 includes a communication connector 614, a power source 612, an ID management unit 622, and a memory 624.

In the present embodiment, the power source 612 supplies electric power to each unit of the ID feeding unit 124. The power source 612 is electrically connected to the power connector 242, and may receive, via the power connector 242, electric power from the electric motorbike 110. The power source 612 may include a storage battery.

In the present embodiment, the communication connector 614 is communicatively connected to the communication connector 244 of the electric motorbike 110. Thus, the ID feeding unit 124 can feed the collation ID stored in the memory 624 to the signal wiring 254 of the electric motorbike 110.

In the present embodiment, the ID management unit 622 manages a collation ID. For example, the ID management unit 622 acquires a collation ID. For example, the ID management unit 622 acquires, from the collation ID writer 140, the collation ID allocated to the electric motorbike 110 or the ID feeding unit 124. The ID management unit 622 may write the above-mentioned collation ID into the memory 624. The ID management unit 622 reads out the collation ID stored in the memory 624 and feeds, via the communication connector 614, the read out collation ID to the signal wiring 254 of the electric motorbike 110. The ID management unit 622 may feed the collation ID stored in the memory 624 to the signal wiring 254 of the electric motorbike 110 at the time of activating the electric motorbike 110.

In the present embodiment, the memory 624 stores the collation ID allocated to the electric motorbike 110 or the ID feeding unit 124.

The ID management unit 622 may be an example of the second identification information acquiring unit. The memory 624 may be an example of the second storage device.

Figure 7:
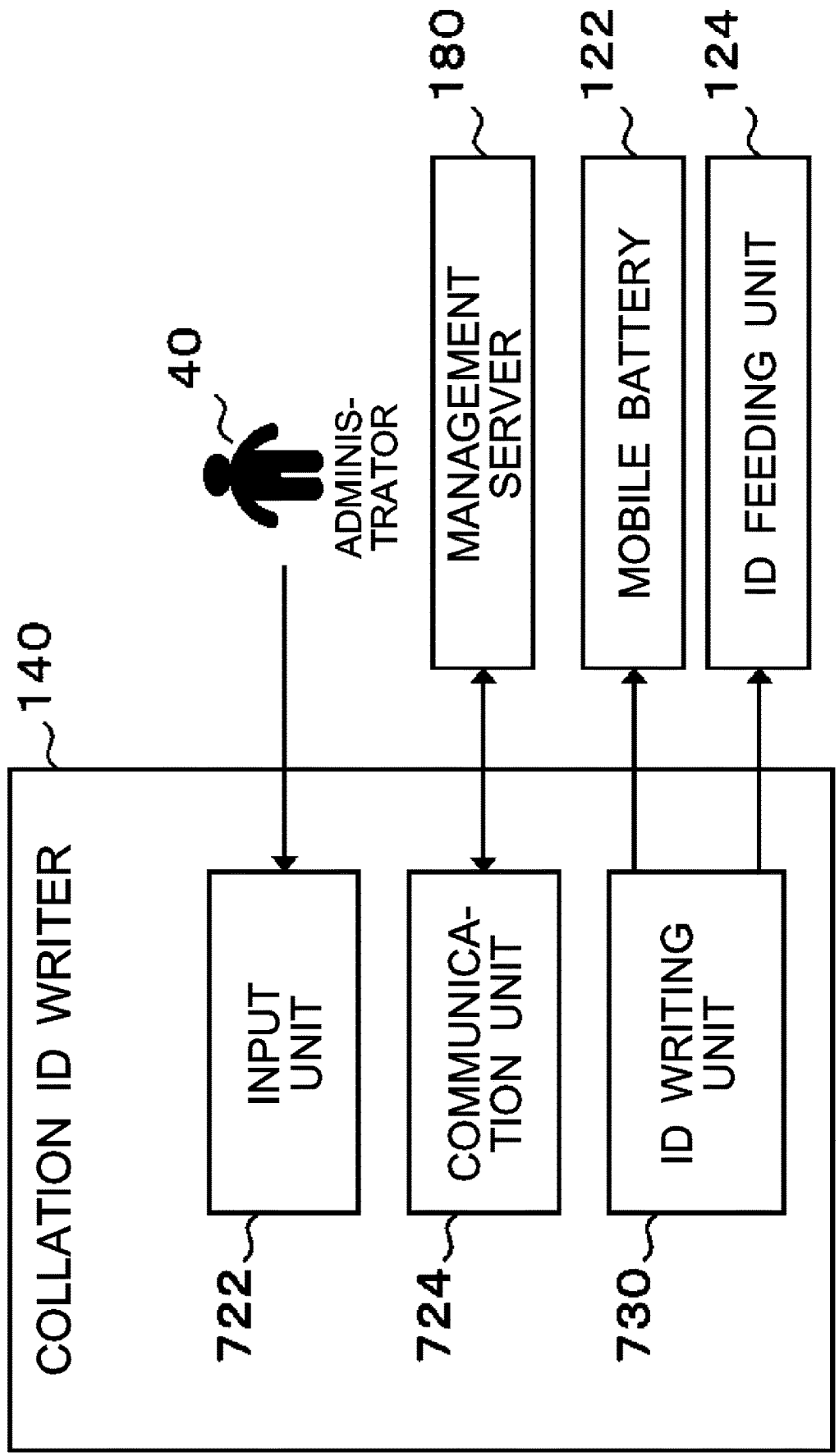
FIG. 7 schematically shows an example of the internal configuration of a collation ID writer 140.

FIG. 7 schematically shows an example of the internal configuration of the collation ID writer 140. In the present embodiment, the collation ID writer 140 includes an input unit 722, a communication unit 724, and an ID writing unit 730.

In the present embodiment, the input unit 722 is configured to accept an input from the administrator 40. For example, the input unit 722 accepts an input of data indicating at least one of the collation ID allocated to the mobile battery 122, or the collation ID allocated to the electric motorbike 110 or the ID feeding unit 124.

The input unit 722 may have any input device. Examples of the above-mentioned input device include a keyboard, a touch panel, a pointing device, a microphone, a camera, a voice input system, a gesture input system, or the like.

In the present embodiment, the communication unit 724 is configured to transmit and receive information with the management server 180. The communication unit 724 may acquire, from the management server 180, data indicating at least one of the collation ID allocated to the mobile battery 122, or the collation ID allocated to the electric motorbike 110 or the ID feeding unit 124.

In the present embodiment, the ID writing unit 730 is configured to output the collation ID allocated to the mobile battery 122 to the mobile battery 122. Thus, the collation ID allocated to the mobile battery 122 is written into the memory 454 of the mobile battery 122. The ID writing unit 730 is configured to output the collation ID allocated to the electric motorbike 110 or the ID feeding unit 124 to the ID feeding unit 124. Thus, the collation ID allocated to the electric motorbike 110 or the ID feeding unit 124 is written into the memory 624 of the ID feeding unit 124.

Figure 8:
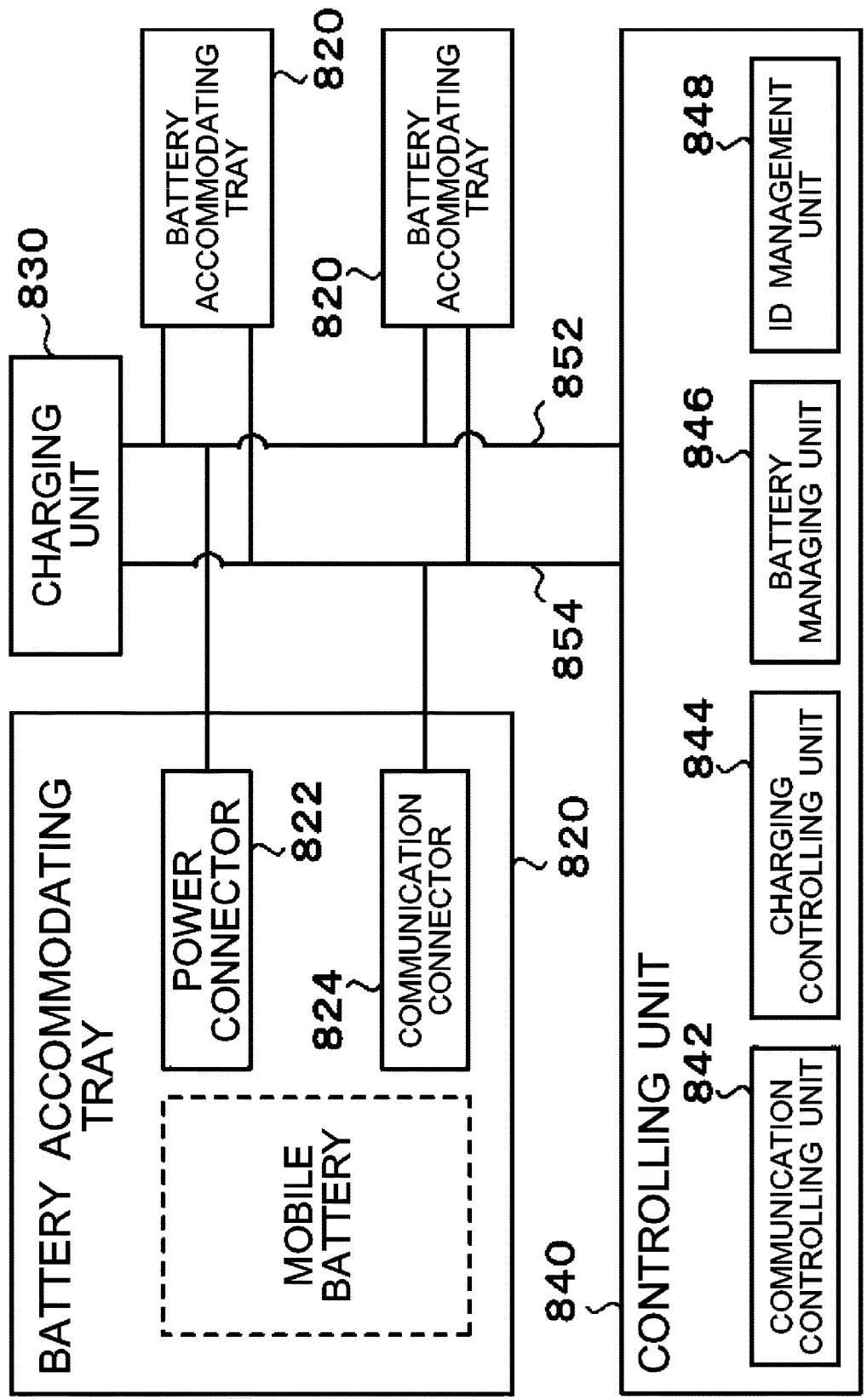
FIG. 8 schematically shows an example of the internal configuration of a battery station 160.

FIG. 8 schematically shows an example of the internal configuration of the battery station 160. In the present embodiment, the battery station 160 includes a battery accommodating tray 820, a charging unit 830, a controlling unit 840, power wiring 852, and a signal wiring 854. In the present embodiment, the battery station 160 includes a plurality of battery accommodating trays 820. Each of the plurality of battery accommodating trays 820 includes a power connector 822 and a communication connector 824. In the present embodiment, the controlling unit 840 includes a communication controlling unit 842, a charging controlling unit 844, a battery managing unit 846, and an ID management unit 848.

In the present embodiment, the battery accommodating tray 820 is configured to accommodate the mobile battery 122. In a single battery accommodating tray 820, a single mobile battery 122 may be accommodated, or a plurality of mobile batteries 122 may be accommodated.

In the present embodiment, the power connector 822 is electrically connected, for example, to the power connector 412 of the mobile battery 122. The power feeding system may be a wired power feeding system, or may be a wireless power feeding system.

In the present embodiment, the communication connector 824 is communicatively connected, for example, to the communication connector 414 of the mobile battery 122. The communication system may be a wired communication system, or may be a wireless communication system.

In the present embodiment, the charging unit 830 supplies electric power to the mobile battery 122 accommodated in the battery accommodating tray 820 to charge the mobile battery 122. The charging unit 830 may charge the mobile battery 122 in accordance with the instruction from the controlling unit 840.

In the present embodiment, the controlling unit 840 is configured to control the operation of the battery station 160. For example, the communication controlling unit 842 controls communication between the battery station 160 and an external information processing device. The charging controlling unit 844 is configured to control the charging operation of the charging unit 830. The charging controlling unit 844 may control the charging of the mobile battery 122 based on information acquired by the battery managing unit 846 from the mobile battery 122. The charging controlling unit 844 may control the charging of the mobile battery 122 in accordance with the instruction from the management server 180. The battery managing unit 846 is configured to monitor the state of one or more mobile batteries 122 accommodated in each of the plurality of battery accommodating trays 820. The battery managing unit 846 may manage the return of the mobile battery 122. The battery managing unit 846 may manage the issue of the mobile battery 122.

In the present embodiment, the ID management unit 848 is configured to manage the collation ID. For example, when the mobile battery 122 is returned by the driver 20, the ID management unit 848 acquires, from the memory 454 of the returned mobile battery 122, the collation ID allocated to said mobile battery. In addition, the ID management unit 848 is configured to write the above-mentioned collation ID into the memory 454 of the mobile battery 122 issued for the above-mentioned driver 20. Note that, the ID management unit 848 may erase the collation ID, allocated to said mobile battery, stored in the memory 454 of the returned mobile battery 122.

Figure 9:
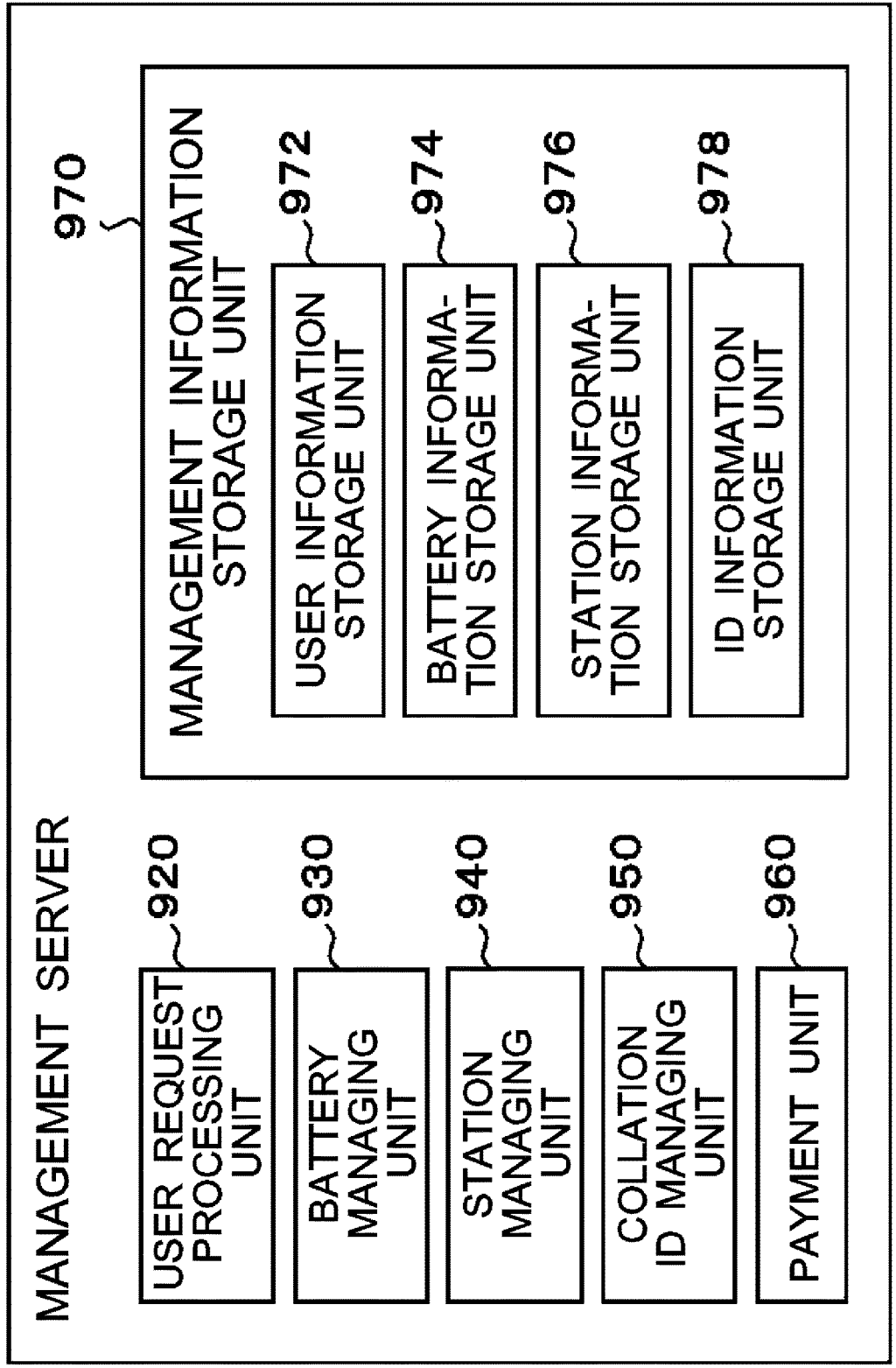
FIG. 9 schematically shows an example of the internal configuration of a management server 180.

FIG. 9 schematically shows an example of the internal configuration of the management server 180. In the present embodiment, the management server 180 includes a user request processing unit 920, a battery managing unit 930, a station managing unit 940, a collation ID managing unit 950, a payment unit 960, and a management information storage unit 970. In the present embodiment, the management information storage unit 970 includes a user information storage unit 972, a battery information storage unit 974, a station information storage unit 976, and an ID information storage unit 978.

In the present embodiment, the user request processing unit 920 is configured to process the request from the driver 20. Examples of the above-mentioned request include an application request of the sharing service, a rental request of the mobile battery 122, a reservation request of the mobile battery 122, or the like.

The user request processing unit 920 determines the collation ID to be allocated to the electric motorbike 110 used by the driver 20 when the user request processing unit 920 accepts an application request of the sharing service. In addition, the user request processing unit 920 determines the mobile battery 122 to be rented to the driver 20. The user request processing unit 920 may transmit the determined collation ID to the collation ID writer 140. Thus, the collation ID is written into each of the storage devices arranged in the electric motorbike 110 used by the driver 20 and the mobile battery 122 rented to the driver 20.

In the present embodiment, the battery managing unit 930 is configured to manage each of one or more mobile batteries 122. For example, the battery managing unit 930 manages the state of each of one or more mobile batteries 122. Examples of the state of the mobile battery 122 include a state of charge, a deterioration state, the driver 20 who is currently using the mobile battery 122, the battery station 160 in which the mobile battery 122 is currently stored, an integrated value of the charge amount, or the like.

In the present embodiment, the station managing unit 940 is configured to manage each of one or more station managing units 940. For example, the station managing unit 940 manages the state of each of one or more battery stations 160. Examples of the state of the battery station 160 include the vacancy state of the battery accommodating tray 820, the number of the mobile battery 122 possible to be rent, or the like.

In the present embodiment, the collation ID managing unit 950 is configured to manage the collation ID allocated to each of one or more mobile batteries 122. The collation ID managing unit 950 may manage the collation ID allocated each of one or more electric motorbikes 110.

In the present embodiment, the payment unit 960 is configured to calculate a price charged to each of one or more drivers 20. For example, the payment unit 960 may calculate the above-mentioned price based on a parameter, such as a used power amount or a travel distance. The payment unit 960 may execute payment processing of the above-mentioned price.

In the present embodiment, the management information storage unit 970 is configured to store various kinds of information. For example, the user information storage unit 972 stores various kinds of information related to each of one or more drivers 20. The battery information storage unit 974 may store various kinds of information related to each of one or more mobile batteries 122. The station information storage unit 976 may store various kinds of information related to each of one or more battery stations 160. The ID information storage unit 978 may store various kinds of information related to the collation ID allocated to each of one or more mobile batteries 122.

FIG. 10 schematically shows an example of a data table 1000. The data table 1000 may be an example of the information related to the collation ID stored in the ID information storage unit 978. In the present embodiment, the data table 1000 stores the collation ID 1012, a unique ID 1014, a user ID 1016, information 1018 indicating the validity period of the collation ID, for each of one or more mobile batteries 122, in association with one another. Note that, in the present embodiment, for the purpose of easy understanding of the battery management system 100, details of the data table 1000 are described in a case where identical collation IDs are allocated to the electric motorbike 110 and the mobile battery 122, as an example.

The collation ID 1012 may be identification information allocated by the battery management system 100. A particular collation ID 1012 may be allocated to a single mobile battery 122, or a particular collation ID 1012 may be allocated to the plurality of mobile batteries 122. A particular collation ID 1012 is allocated to the plurality of mobile batteries 122, so that identical collation IDs 1012 can be allocated, for example, for a plurality of mobile batteries 122 used by employees of a corporation. In addition, identical collation IDs 1012 can be allocated to a plurality of mobile batteries 122 used by family.

The unique ID 1014 may be identification information unique to each of one or more mobile batteries 122. Therefore, even when a particular collation ID 1012 is allocated to a plurality of mobile batteries 122, the above-mentioned plurality of mobile batteries 122 have unique IDs 1014 different from one another. Thus, each of one or more mobile batteries 122 can be managed individually.

The user ID 1016 may be identification information of the driver 20 using the mobile battery 122 for which a collation ID 1012 is allocated. In a case where a particular mobile battery 122 is shared by a particular plurality of drivers 20, identification information of the plurality of drivers 20 may be recorded on a section of the user ID 1016.

The information 1018 indicating the validity period of the collation ID may include information indicating the beginning point of said validity period. The information 1018 indicating the validity period of the collation ID may include information indicating the end point of said validity period.

FIG. 11 schematically shows an example of a data table 1100. The data table 1100 may be an example of information related to the collation ID stored in the ID information storage unit 978. In the present embodiment, the data table 1100 is configured to store a unique ID 1112, information 1114 indicating the update history of the collation ID allocated to the mobile battery 122, for each of one or more mobile batteries 122, in association with one another. Thus, the history of the battery station 160 to which each mobile battery has been returned can be tracked. In addition, the history of the battery station 160 from which each mobile battery has been issued can be tracked.

Examples of the information 1114 indicating the update history of the collation ID include a collation ID recorded on the memory 454 of the mobile battery 122, information indicating the time of day when the above-mentioned collation ID has been recorded, identification information of a terminal on which the above-mentioned collation ID has been recorded, or the like. Examples of the terminal on which the above-mentioned collation ID has been recorded include the collation ID writer 140, the battery station 160, or the like. Note that when the collation ID has been erased by the battery station 160, the information 1114 indicating the update history of the collation ID may include the identification information of the battery station 160 that has erased the collation ID, and information indicating the time of day when the collation ID was erased.

FIG. 12 schematically shows an example of a data table 1200. The data table 1200 may be an example of information related to the collation ID stored in the ID information storage unit 978. In the present embodiment, the data table 1200 is configured to store a unique ID 1212, and information 1214 indicating the reception history of the collation ID allocated to the electric motorbike 110, for each of one or more mobile batteries 122, in association with one another. Thus, the history of the electric motorbike 110 on which the mobile battery 122 is mounted can be tracked.

Examples of the information 1214 indicating the reception history of the collation ID include, for example, a collation ID transmitted to the mobile battery 122, information indicating the time of day when the above-mentioned collation ID was received, identification information of a terminal having transmitted the above-mentioned collation ID, or the like. Examples of the terminal having transmitted the collation ID include the electric motorbike 110, ID feeding unit 124, or the like.

Figure 13:
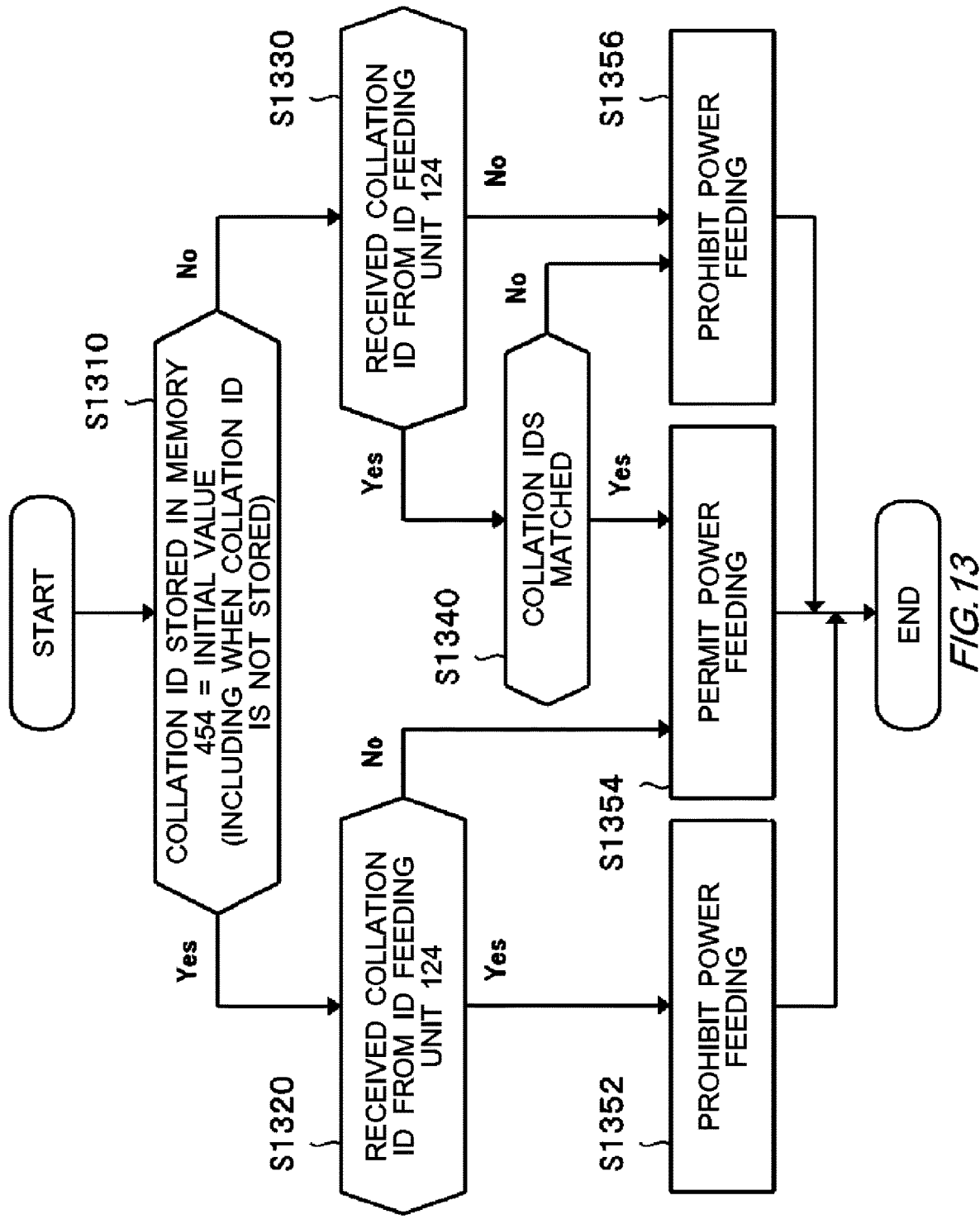
FIG. 13 schematically shows an example of information processing at a collating unit 530.

FIG. 13 schematically shows an example of information processing at the collating unit 530. More specifically, FIG. 13 is used to describe an example of the collation processing by the collating unit 530. According to the present embodiment, when the collation processing begins, the collating unit 530 firstly executes processing for acquiring the collation ID of the mobile battery 122 from the memory 454 of the mobile battery 122 at step 1310 (the step may be abbreviated as S).

Next, the collating unit 530 judges whether the collation ID acquired from the memory 454 is the initial value. Note that the collating unit 530 may judge the collation ID acquired from the memory 454 is the initial value if the collating unit 530 cannot acquire the collation ID of the mobile battery 122 in a predetermined period.

When it is judged, at S1310, that the collation ID acquired from the memory 454 is the initial value (Yes at S1310), the collating unit 530 executes the processing for acquiring the collation ID allocated to the electric motorbike 110 on which the mobile battery 122 is mounted at S1320. In addition, the collating unit 530 judges whether the collation ID allocated to the electric motorbike 110 on which the mobile battery 122 is mounted has been acquired. For example, the collating unit 530 judges whether the collation ID from the ID feeding unit 124 has been received.

When it is judged, at S1320, that the collation ID from the ID feeding unit 124 has been received (Yes at S1320), the collating unit 530 determines to prohibit the power feeding from the mobile battery 122 to the electric motorbike 110 in S1352. Thus, the collation processing is completed. When it is judged, at S1320, that the collation ID from the ID feeding unit 124 has not been received (No at S1320), the collating unit 530 determines to permit the power feeding from the mobile battery 122 to the electric motorbike 110 at S1354. Thus, the collation processing is completed.

Meanwhile, when it is judged, at S1310, that the collation ID acquired from the memory 454 is not the initial value (No at S1310), the collating unit 530 executes the processing for acquiring the collation ID allocated to the electric motorbike 110 on which the mobile battery 122 is mounted at S1330. In addition, the collating unit 530 judges whether the collation ID allocated to the electric motorbike 110 on which the mobile battery 122 is mounted has been acquired. For example, the collating unit 530 judges whether the collation ID from the ID feeding unit 124 has been received.

When it is judged, at S1330, that the collation ID from the ID feeding unit 124 has been received (Yes at S1330), the collating unit 530 judges whether the collation ID acquired from the memory 454 and the collation ID from the ID feeding unit 124 match at S1340. When it is judged that the above-mentioned two collation IDs matched (Yes at S1340), the collating unit 530 determines to permit the power feeding from the mobile battery 122 to the electric motorbike 110 at S1354. Thus, the collation processing is completed. Meanwhile, when it is judged that the above-mentioned two collation IDs does not match (No at S1340), the collating unit 530 determines to prohibit the power feeding from the mobile battery 122 to the electric motorbike 110 at S1356. Thus, the collation processing is completed.

When it is judged, at S1330, that the collation ID from the ID feeding unit 124 has not been received (No at S1330), the collating unit 530 determines to prohibit the power feeding from the mobile battery 122 to the electric motorbike 110 at S1356. Thus, the collation processing is completed.

Figure 14:
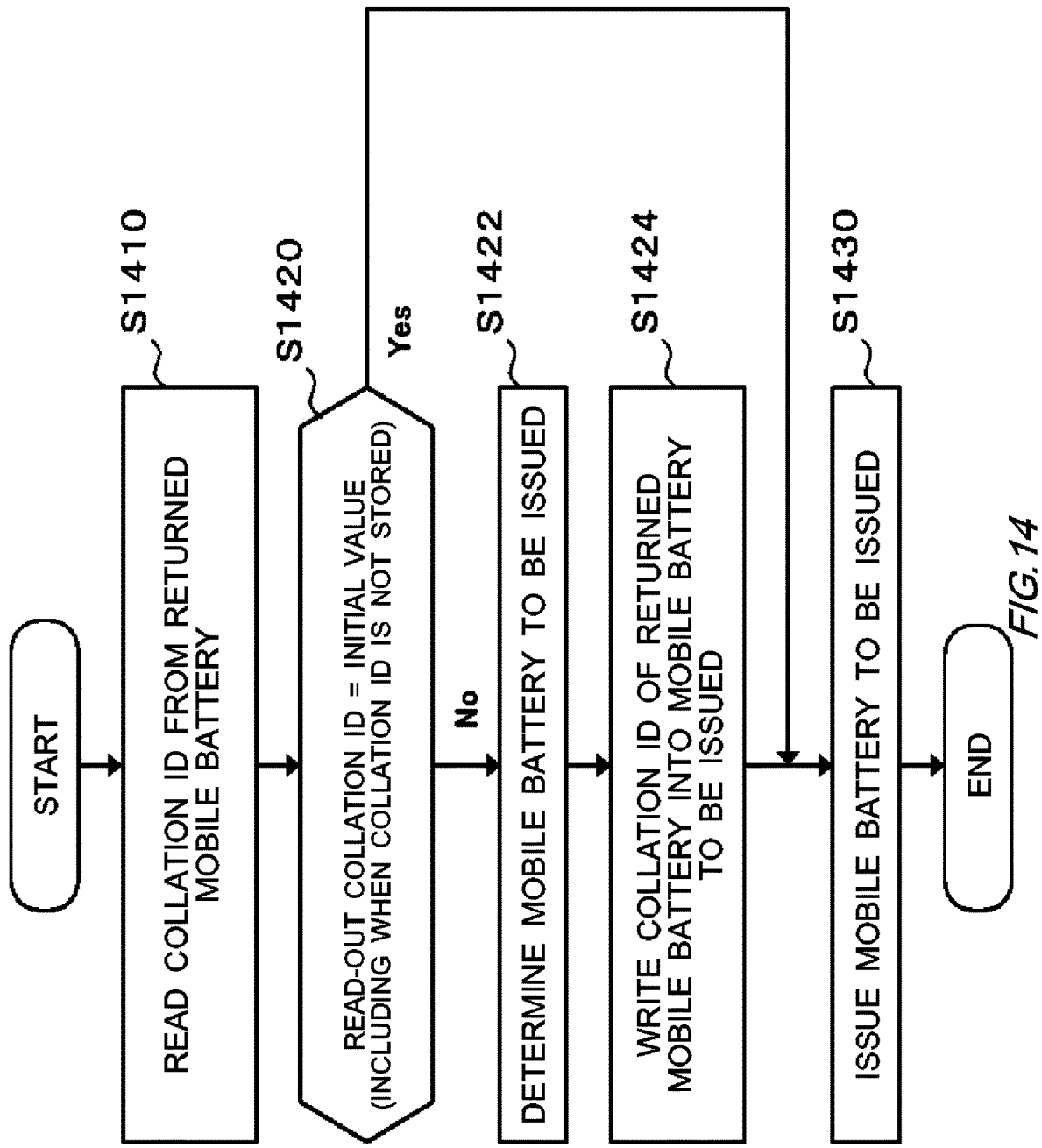
FIG. 14 schematically shows an example of the information processing at the battery station 160.

FIG. 14 and FIG. 15 are used to describe an example of the information processing at the battery station 160. More specifically, an example of replacement processing of the mobile battery 122 is described. FIG. 14 schematically shows an example of the information processing at the battery station 160. FIG. 15 schematically shows an example of the transition of the collation ID.

In the embodiment shown in FIG. 14, for example, when the remaining capacity of the mobile battery 122 mounted on the electric motorbike 110 becomes small, the driver 20 of the electric motorbike 110 drives the electric motorbike 110 to move the electric motorbike 110 to a neighboring battery station 160. The driver 20 of the electric motorbike 110 operates the battery station 160 to request the replacement of mobile battery 122.

When the replacement processing of the mobile battery 122 is begun, returning processing of the used mobile battery 122 is accepted. Thus, the driver 20 is allowed to cause the used mobile battery 122 to be accommodated in the battery accommodating tray 820. Then, the driver 20 detaches the mobile battery 122 from the electric motorbike 110 and causes the mobile battery 122 detached from the electric motorbike 110 to be accommodated in a vacant battery accommodating tray 820. The battery accommodating tray 820 to which the mobile battery 122 is returned may be selected by the driver 20 or may be designated by the controlling unit 840.

When the mobile battery 122 is returned to the battery station 160, the ID management unit 848 acquires, from the memory 454 of the returned mobile battery 122, the collation ID allocated to said mobile battery at S1410. The ID management unit 848 outputs the collation ID of the returned mobile battery 122 to the battery managing unit 846.

Next, at S 1420, the battery managing unit 846 judges whether the collation ID of the returned mobile battery 122 is the initial value. Note that when the ID management unit 848 or the battery managing unit 846 cannot acquire the collation ID of the returned mobile battery 122 in a predetermined period, the battery managing unit 846 may judge that the collation ID of the returned mobile battery 122 is the initial value.

When it is judged, at S1420, that the collation ID of the returned mobile battery 122 is not the initial value (No at S1420), the battery managing unit 846 determines the mobile battery 122 to be issued at S1422. The method of determining the mobile battery 122 to be issued is not particularly limited. The battery managing unit 846 may determine the mobile battery 122 to be issued based on at least one of the instruction from the driver 20 or the instruction from the management server 180.

In one embodiment, the battery managing unit 846 determines the mobile battery 122 to be issued from among mobile batteries 122 whose remaining capacity is larger than a predetermined value. In another embodiment, the battery managing unit 846 determines the mobile battery 122 to be issued according to a predetermined priority. For example, the battery managing unit 846 acquires, from the management server 180, information indicating the above-mentioned priority. In still another embodiment, the battery managing unit 846 acquires, from the management server 180, information indicating mobile batteries 122 possible to be issued or mobile batteries 122 impossible to be issued. The battery managing unit 846 may determine the mobile battery 122 to be issued from among the mobile batteries 122 possible to be issued, or may determine the mobile battery 122 to be issued from among mobile batteries 122 other than the mobile batteries 122 impossible to be issued.

Note that in the present embodiment, as described in connection with FIG. 8, for example, when the mobile battery 122 is returned to the battery station 160, the collation ID stored in the memory 454 of the returned mobile battery 122 is erased. However, in another embodiment, when the mobile battery 122 is returned, the collation ID stored in the memory 454 of the returned mobile battery 122 may not be erased. In this case, it is possible that the collation ID of the mobile battery 122 determined as the one to be issued at S1420 is the initial value.

At S 1422, the battery managing unit 846 may or may not select the mobile battery 122 whose collation ID is the initial value as the one to be issued. At S 1422, when the battery managing unit 846 selects the mobile battery 122 whose collation ID is the initial value as the one to be issued, the battery managing unit 846, for example, may refer to the database in which the identification information of the mobile battery 122 and the owner of the mobile battery 122 are stored in association with each other, to specify the owner of the mobile battery 122 whose collation ID is the initial value. Thus, the battery managing unit 846 can grasp that the mobile battery 122 whose collation ID is the initial value is owned by another person or can track the owner of the mobile battery 122 whose collation ID is the initial value.

Next, at S 1424, the ID management unit 848 executes the processing for writing, into the memory 454 of the mobile battery 122 to be issued, the collation ID acquired from the returned mobile battery 122. The ID management unit 848 may execute the processing for erasing the collation ID stored in the memory 454 of the returned mobile battery 122.

After this, at S 1430, the battery managing unit 846 issues the mobile battery 122 to be issued. Thus, the replacement processing of the mobile battery 122 ends.

Meanwhile, when it is judged, at S 1420, that the collation ID of the returned mobile battery 122 is the initial value (Yes at S 1420), the battery managing unit 846 issues the mobile battery 122 to be issued at S 1430. Thus, the replacement processing of the mobile battery 122 ends.

When it is judged, at S 1420, that the collation ID of the returned mobile battery 122 is the initial value, the battery managing unit 846 may determine the mobile battery 122 return from the driver 20 as the one to be issued. Thus, the mobile battery 122 returned from the driver 20 is prevented from being replaced with another mobile battery 122.

Note that in the present embodiment, details of the replacement processing of the mobile battery 122 are described in a case where the returning processing of the used mobile battery 122 is accepted after the replacement processing of the mobile battery 122 is begun as an example. However, the replacement processing of the mobile battery 122 is not limited to the present embodiment. In another embodiment, the replacement processing of the mobile battery 122 is begun in response to the used mobile battery 122 being accommodated in the battery accommodating tray 820.

FIG. 15 shows an example of the relationship between various events occurring in the sharing service and the generation or update of the collation ID. Specifically, an example of the above-mentioned relationship is described in a case where the management server 180 accepts the application request of the sharing service from a user and permits the user the use of a vehicle 1522 and a mobile battery 1512, as an example. In addition, an example of the above-mentioned relationship is described in a case where mobile battery 1512 is replaced with a mobile battery 1514 accommodated in the battery station 160, as an example. Further, an example of the above-mentioned relationship is described in a case where the mobile battery 1514 issued for a user is mounted on a vehicle (which is referred to as a vehicle 1524) which is different from the vehicle 1522, as an example.

Each of the mobile battery 1512 and the mobile battery 1514 may have the same configuration as the mobile battery 122. The vehicle 1522 and the vehicle 1524 may have the same configuration as the electric motorbike 110.

First, when the use of the vehicle 1522 and the mobile battery 1512 by the user is permitted, the collation ID is written into the vehicle 1522 and the mobile battery 1512 before the mobile battery 1512 is handed over to the user. As shown in FIG. 15, according to the present embodiment, identical collation IDs are written into the vehicle 1522 and the mobile battery 1512.

Note that, according to the present embodiment, at this moment, the mobile battery 1514 is accommodated in the battery station 160 and awaits so as to be prepared for being the one to be issued. Therefore, the memory 454 of the mobile battery 1514 does not store the collation ID. In addition, because the vehicle 1524 is a vehicle different from the vehicle 1522, a collation ID different from the collation ID allocated to the vehicle 1522 is allocated to the vehicle 1524.

Next, when the vehicle 1522 is equipped with the mobile battery 1512, the collating unit 530 collates the collation ID of the mobile battery 1512 and the collation ID of the vehicle 1522, as described above. As shown in FIG. 15, according to the present embodiment, because the two match, the power supply from the mobile battery 1512 to the vehicle 1522 is permitted. Thus, the user can travel by using the electric motorbike 110.

Next, when the vehicle 1522 is equipped with the mobile battery 1512, the battery station 160 determines to issue the mobile battery 1514. At this moment, the collation ID stored in the mobile battery 1512 is inherited by the mobile battery 1514. In addition, the collation ID is erased from the memory 454 of the mobile battery 1512.

After this, when the vehicle 1522 is equipped with the mobile battery 1514, the collating unit 530 collates the collation ID of the mobile battery 1514 and the collation ID of the vehicle 1522. In this case, because the two match, the power supply from the mobile battery 1514 to the vehicle 1522 is permitted.

Meanwhile, when the vehicle 1524 is equipped with the mobile battery 1514, the collating unit 530 collates the collation ID of the mobile battery 1514 and the collation ID of the vehicle 1524. In this case, because the two do not match, the power supply from the mobile battery 1514 to the vehicle 1524 is prohibited.

FIG. 16 schematically shows another example of the ECU 264. In the embodiments described in connection with FIG. 1 to FIG. 15, details of the approach of controlling the function or performance of the electric motorbike 110 have been described in a case where the collating unit 530 is arranged in the mobile battery 122, and the mobile battery 122 controls the power supply from the mobile battery 122 to the electric motorbike 110, as an example.

However, as described in connection with FIG. 1, the approach of controlling the function or performance of the electric motorbike 110 is not limited to the embodiments described in connection with FIG. 1 to FIG. 15. FIG. 16 is used to describe another example of the approach of controlling the function or performance of the electric motorbike 110.

In embodiments described in connection with FIG. 16, the collating unit 530 is arranged in the ECU 264 of the electric motorbike 110, the ECU 264 executes the collation processing between the collation ID allocated to the mobile battery 122 and the collation ID allocated to the electric motorbike 110 or the ID feeding unit 124, which is the difference of the battery management system 100 or the ECU 264 described in connection with FIG. 16 from that described in connection with FIG. 1 to FIG. 15.

In addition, in embodiments described in connection with FIG. 16, the collating unit 530 outputs a start controlling signal for controlling each unit of the electric motorbike 110 instead of a power feeding control signal, which is the difference of the battery management system 100 or the ECU 264 described in connection with FIG. 16 from that described in connection with FIG. 1 to FIG. 15. With respect to features other than the above-mentioned differences, the battery management system 100 or the ECU 264 described in connection with FIG. 16 may have the same configuration of the battery management system 100 or the ECU 264 described in connection with FIG. 1 to FIG. 15.

In the present embodiment, the ECU 264 includes an ID management unit 520, a collating unit 530, an power controlling unit 542, a drive controlling unit 1644 for driving a motor 280, and a battery controlling unit 1646 for controlling a BMS 262. The ID management unit 520, the collating unit 530, and the power controlling unit 542 may have the same configuration as the ID management unit 520, the collating unit 530, and the power controlling unit 542 of the controller 452 arranged in the mobile battery 122 described in connection with FIG. 5.

In the present embodiment, the ID management unit 520 is configured to acquire, via the communication connector 244, the collation ID allocated to the electric motorbike 110 or the ID feeding unit 124 from the collation ID writer 140. In addition, the ID management unit 520 is configured to acquire, via the communication connector 224, the collation ID allocated to the mobile battery 122 from the mobile battery 122. The ID management unit 520 outputs the collation ID allocated to the electric motorbike 110 or the ID feeding unit 124 and the collation ID allocated to the mobile battery 122 to the collating unit 530.

In the present embodiment, the collating unit 530 output the start controlling signal for controlling the electric motorbike 110, as information indicating the collation result, instead of the power feeding control signal. Examples of the start controlling signal include a signal indicating the permission of the power supply from the mobile battery 122 to the electric motorbike 110, a signal indicating the prohibition or limitation of the power supply from the mobile battery 122 to the electric motorbike 110, a signal to permit starting the motor 280, a signal indicating the prohibition or limitation of starting the motor 280, or the like.

In one embodiment, the collating unit 530 is configured to transmit, to the power controlling unit 542, the signal indicating the permission of the power supply from the mobile battery 122 to the electric motorbike 110, or the signal indicating the prohibition or limitation of the power supply from the mobile battery 122 to the electric motorbike 110. In this case, the power controlling unit 542 control the power control circuit 270 to control the power supply from the mobile battery 122 to the electric motorbike 110. Thus, the operation of the electric motorbike 110 can be controlled.

In another embodiment, the collating unit 530 is configured to transmit, to the drive controlling unit 1644, the signal to permit starting the motor 280, or the signal indicating the prohibition or limitation of starting the motor 280. In this case, the drive controlling unit 1644 controls the motor 280 in accordance with the above-mentioned signal. Thus, the operation of the electric motorbike 110 can be controlled.

In still another embodiment, the collating unit 530 is configured transmit, to the battery controlling unit 1646, the signal indicating the permission of the power supply from the mobile battery 122 to the electric motorbike 110, or the signal indicating the prohibition or limitation of the power supply from the mobile battery 122 to the electric motorbike 110. In this case, the battery controlling unit 1646 controls the controller 452 of the mobile battery 122 via the BMS 262. Thus, the power supply from the mobile battery 122 to the electric motorbike 110 can be adjusted. As a result, the operation of the electric motorbike 110 can be controlled.

Figure 17:
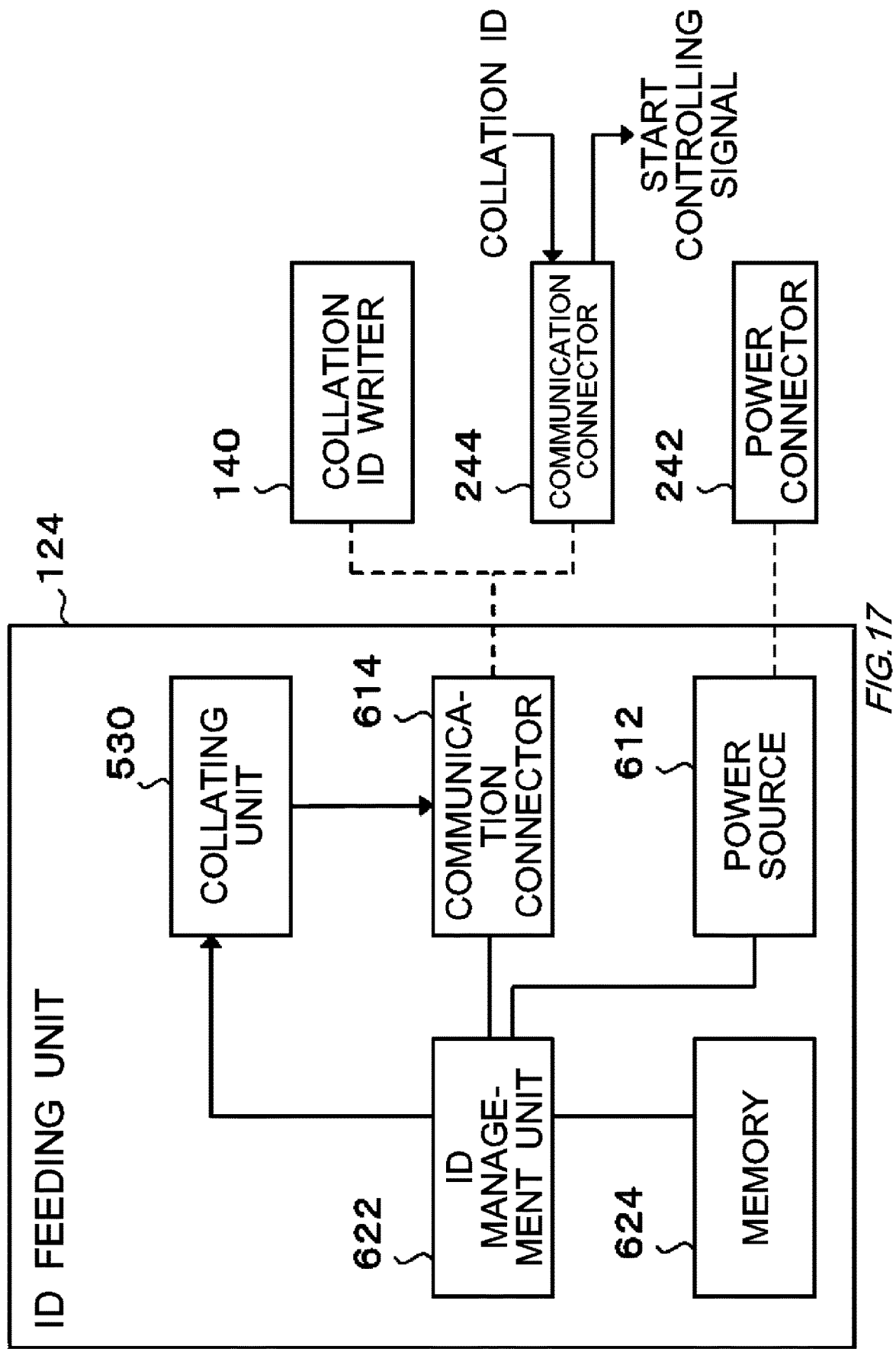
FIG. 17 schematically shows another example of the ID feeding unit 124.

FIG. 17 schematically shows another example of the ID feeding unit 124. In the embodiments described in connection with FIG. 1 to FIG. 15, details of the approach of controlling the function or performance of the electric motorbike 110 have been described in a case where the collating unit 530 is arranged in the mobile battery 122, and the mobile battery 122 controls the power supply from the mobile battery 122 to the electric motorbike 110, as an example.

However, as described in connection with FIG. 1, the approach of controlling the function or performance of the electric motorbike 110 is not limited to the embodiments described in connection with FIG. 1 to FIG. 15. FIG. 17 is used to describe another example of the approach of controlling the function or performance of the electric motorbike 110.

In embodiments described in connection with FIG. 17, the collating unit 530 is arranged in the ID feeding unit 124, the ID feeding unit 124 executes the collation processing between the collation ID allocated to the mobile battery 122 and the collation ID allocated to the electric motorbike 110 or the ID feeding unit 124, which is the difference of the battery management system 100 or the ID feeding unit 124 described in connection with FIG. 17 from that described in connection with FIG. 1 to FIG. 15.

In the present embodiment, the ID feeding unit 124 further includes the collating unit 530 in addition to the ID feeding unit 124 described in connection with FIG. 6. In the present embodiment, the ID management unit 622 and the collating unit 530 each may have a configuration which is same as the configuration of the ID management unit 520 and the collating unit 530 of the controller 452 arranged in the mobile battery 122 described in connection with FIG. 5.

In the present embodiment, the ID management unit 622 is configured to acquire, via the communication connector 244 of the electric motorbike 110, the collation ID allocated to the mobile battery 122 from the mobile battery 122. In addition, as described above, the ID management unit 622 is configured to acquire the collation ID allocated to the electric motorbike 110 or the ID feeding unit 124 from the collation ID writer 140. The ID management unit 622 outputs, to the collating unit 530, the collation ID allocated to the electric motorbike 110 or the ID feeding unit 124 and the collation ID allocated to the mobile battery 122.

In the present embodiment, the collating unit 530 outputs the start controlling signal for controlling the electric motorbike 110, as information indicating the collation result, instead of the power feeding control signal. Examples of the start controlling signal include the signal indicating the permission of the power supply from the mobile battery 122 to the electric motorbike 110, the signal indicating the prohibition or limitation of the power supply from the mobile battery 122 to the electric motorbike 110, the signal to permit starting the motor 280, the signal indicating the prohibition or limitation of starting the motor 280, or the like.

In one embodiment, the collating unit 530 is configured to transmit the above-mentioned start controlling signal to the ECU 264 of the electric motorbike 110. The ECU 264 controls the electric motorbike 110 or the mobile battery 122 based on the start controlling signal through the same approach as the embodiments described in connection with FIG. 16. Thus, the operation of the electric motorbike 110 can be controlled.

In another embodiment, the collating unit 530 transmits, via the electric motorbike 110, the signal indicating the permission of the power supply from the mobile battery 122 to the electric motorbike 110, or the signal indicating the prohibition or limitation of the power supply from the mobile battery 122 to the electric motorbike 110, to mobile battery 122. Thus, the operation of the electric motorbike 110 can be controlled.

Figure 18:
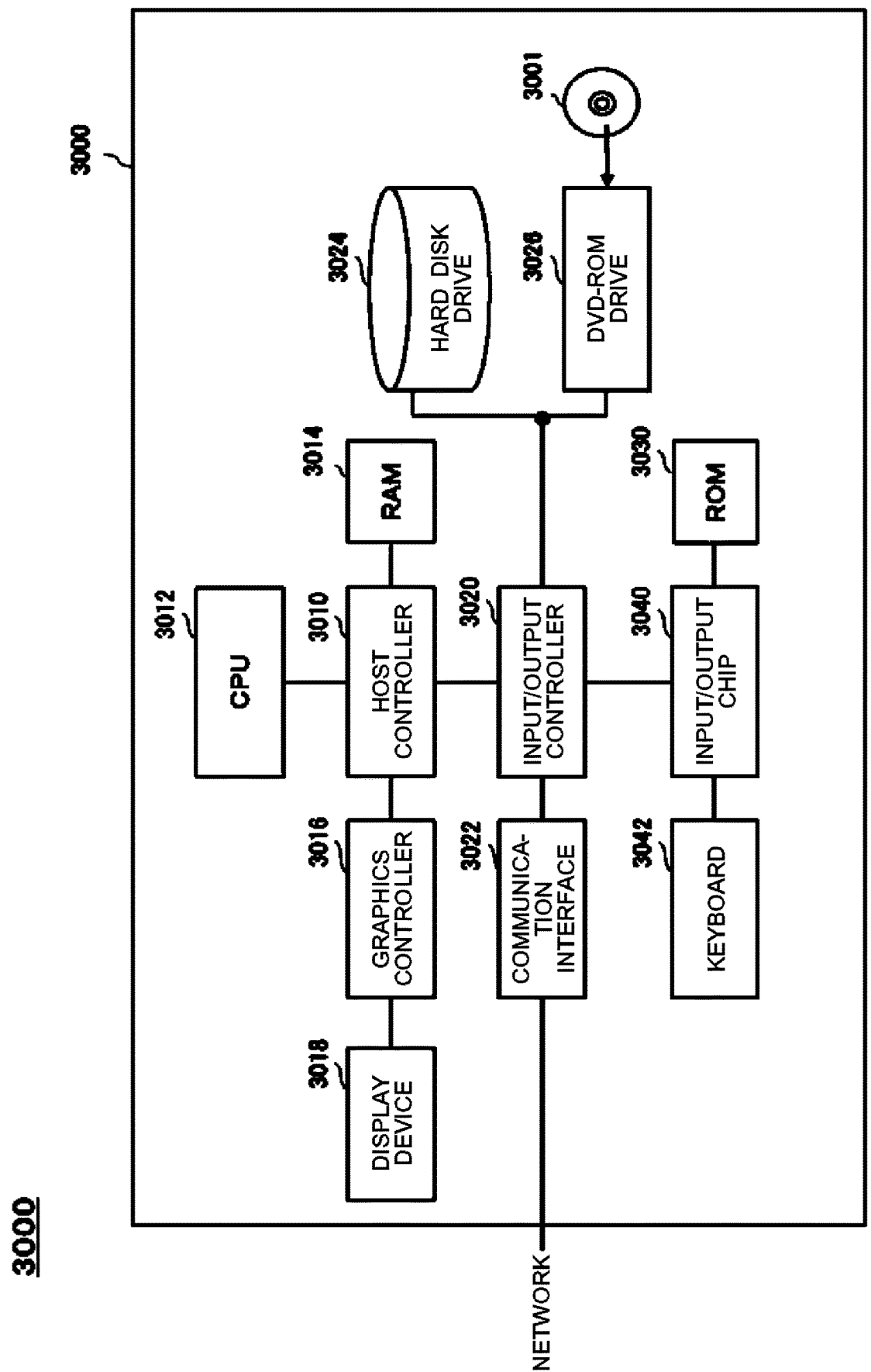
FIG. 18 schematically shows an example of the internal configuration of a computer 3000.

FIG. 18 shows an example of a computer 3000 in which a plurality of aspects of the present invention may be embodied entirely or partially. At least a part of the battery management system 100 may be implemented by the computer 3000.

For example, the BMS 262 and the ECU 264 of the electric motorbike 110 or a part thereof are implemented by the computer 3000. The controller 452 of the mobile battery 122 or a part thereof may be implemented by the computer 3000. The ID feeding unit 124 or a part thereof may be implemented by the computer 3000. The collation ID writer 140 or a part thereof may be implemented by the computer 3000. The battery station 160 of the controlling unit 840 or a part thereof may be implemented by the computer 3000. The management server 180 or a part thereof may be implemented by the computer 3000.

A program that is installed in the computer 3000 can cause the computer 3000 to execute an operation associated with an apparatus according to the embodiment of the present invention or to function as one or plurality of "units" of the apparatus, or can cause the computer 3000 to perform the operation or the one or plurality of units thereof, and/or cause the computer 3000 to perform processes of the embodiment according to the present invention or steps thereof. Such a program may be executed by the CPU 3012 to cause the computer 3000 to perform particular operations associated with some or all of the blocks of flowcharts and block diagrams described herein.

The computer 3000 in accordance with the present embodiment includes a CPU 3012, a RAM 3014, a GPU 3016, and a display device 3018, which are mutually connected by a host controller 3010. The computer 3000 also includes input/output units such as a communication interface 3022, a hard disk drive 3024, a DVD-ROM drive 3026 and an IC card drive, which are connected to the host controller 3010 via an input/output controller 3020. The computer also includes legacy input/output units such as a ROM 3030 and a keyboard 3042, which are connected to the input/output controller 3020 through an input/output chip 3040.

The CPU 3012 operates according to programs stored in the ROM 3030 and the RAM 3014, thereby controlling each unit. The GPU 3016 acquires image data generated by the CPU 3012 on a frame buffer or the like provided in the RAM 3014 or in itself, and causes the image data to be displayed on a display device 3018.

The communication interface 3022 performs communication with other electronic devices via a network. The hard disk drive 3024 stores programs and data that are used by the CPU 3012 within the computer 3000. The DVD-ROM drive 3026 reads the programs or the data from the DVD-ROM 3001, and provides the hard disk drive 3024 with the programs or the data via the RAM 3014. The IC card drive reads programs and data from an IC card, and/or writes programs and data into the IC card.

The ROM 3030 stores therein a boot program or the like that is executed by the computer 3000 at the time of activation, and/or a program depending on the hardware of the computer 3000. The input/output chip 3040 may also connect various input/output units to the input/output controller 3020 via a parallel port, a serial port, a keyboard port, a mouse port or the like.

A program is provided by a computer-readable storage medium, such as the DVD-ROM 3001 or the IC card. The program is read from the computer-readable storage medium, installed into the hard disk drive 3024, RAM 3014, or ROM 3030, which are also examples of computer-readable storage medium, and executed by the CPU 3012. The information processing described in these programs is read into the computer 3000, resulting in cooperation between a program and the above-mentioned various types of hardware resources. An apparatus or method may be constituted by implementing the operation or processing of information in accordance with the usage of the computer 3000.

For example, when communication is executed between the computer 3000 and an external device, the CPU 3012 may execute a communication program loaded onto the RAM 3014 to command the communication interface 3022 to execute a communication processing, based on the processing described in the communication program. The communication interface 3022, under control of the CPU 3012, reads transmission data stored on a transmission buffer region provided in a recording medium such as the RAM 3014, the hard disk drive 3024, the DVD-ROM 3001, or the IC card, and transmits the read transmission data to a network or writes reception data received from a network into a reception buffer region or the like provided on the recording medium.

In addition, the CPU 3012 may cause all or a necessary portion of a file or a database to be read into the RAM 3014, the file or the database having been stored in an external recording medium such as the hard disk drive 3024, the DVD-ROM drive 3026 (DVD-ROM 3001), the IC card, etc., and execute various types of processing on the data on the RAM 3014. The CPU 3012 may then write back the processed data to the external recording medium.

Various types of information, such as various types of programs, data, tables, and databases, may be stored in the recording medium to undergo information processing. The CPU 3012 may execute various types of processing on the data read from the RAM 3014, which includes various types of operations, information processing, condition judging, conditional branch, unconditional branch, search/replacement of information, etc., as described throughout this disclosure and designated by an command sequence of programs, and writes the result back to the RAM 3014. In addition, the CPU 3012 may search for information in a file, a database, etc., in the recording medium. For example, when a plurality of entries, each having an attribute value of a first attribute associated with an attribute value of a second attribute, are stored in the recording medium, the CPU 3012 may search for an entry whose attribute value of the first attribute matches the condition a designated condition, from among the plurality of entries, and read the attribute value of the second attribute stored in the entry, thereby acquiring the attribute value of the second attribute associated with the first attribute satisfying the predetermined condition.

The above-described program or software modules may be stored in the computer-readable storage medium on or near the computer 3000. In addition, a recording medium such as a hard disk or a RAM provided in a server system connected to a dedicated communication network or the Internet can be used as the computer-readable storage medium, thereby providing the above-mentioned program to the computer 3000 via the network.

While the embodiments of the present invention have been described, the technical scope of the invention is not limited to the above described embodiments. It is apparent to persons skilled in the art that various alterations and improvements can be added to the above-described embodiments. In addition, to the extent that there is no technical contradiction, the matters described for the specific embodiment can be applied to other embodiments. In addition, each component may have the feature similar to those of other components having the same names but different reference signs and numerals. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

For example, the following matters are described herein.

[Item 1] A control device for controlling a power supply device configured to supply electric power to a power consumption device configured to consume electric power, comprising:

a first identification information acquiring unit configured to acquire first identification information which is identification information for identifying the power supply device;

a second identification information acquiring unit configured to acquire second identification information which is identification information for identifying the power consumption device; and a determining unit configured to determine, when the first identification information acquired by the first identification information acquiring unit and the second identification information acquired by the second identification information acquiring unit do not match, (i) to prohibit or limit power supply from the power supply device to the power consumption device, (ii) to output an identification abnormality signal indicating that the first identification information and the second identification information do not match, or (iii) not to output an identification normality signal indicating that the first identification information and the second identification information match.

[Item 2] The control device according to item 1, wherein even when the first identification information and the second identification information do not match, if the first identification information meets a first condition, and the second identification information could not be acquired by the second identification information acquiring unit within a predetermined period, the determining unit is configured to determine (iv) to permit the power supply from the power supply device to the power consumption device, (v) not to output the identification abnormality signal, or (vi) to output the identification normality signal.

[Item 3] The control device according to item 1, wherein if the first identification information meets a first condition, and the second identification information has been acquired by the second identification information acquiring unit within a predetermined period, the determining unit is configured to determine, regardless of whether the first identification information and the second identification information match, (i) to prohibit or limit the power supply from the power supply device to the power consumption device, (ii) to output the identification abnormality signal, or (iii) not to output the identification normality signal.

[Item 4] The control device according to item 1, wherein if the first identification information does not meet a first condition, and the second identification information could not be acquired by the second identification information acquiring unit within a predetermined period, the determining unit is configured to determine, regardless of whether the first identification information and the second identification information match, (i) to prohibit or limit the power supply from the power supply device to the power consumption device, (ii) to output the identification abnormality signal, or (iii) not to output the identification normality signal.

[Item 5] The control device according to any one of items 2 to 4, wherein the first condition is:
- a condition that the first identification information is a predetermined value or symbol; or
- a condition that the first identification information includes a predetermined value or symbol.

[Item 6] A control device for controlling a power supply device configured to supply electric power to a power consumption device configured to consume electric power, comprising:
- a first identification information acquiring unit configured to acquire first identification information which is identification information for identifying the power supply device;
- a second identification information acquiring unit configured to acquire second identification information which is identification information for identifying the power consumption device; and
- a determining unit configured to determine, when the first identification information acquired by the first identification information acquiring unit and the second identification information acquired by the second identification information acquiring unit match, (iv) to permit power supply from the power supply device to the power consumption device, (v) not to output an identification abnormality signal indicating that the first identification information and the second identification information do not match, or (vi) to output an identification normality signal indicating that the first identification information and the second identification information match.

[Item 7] The control device according to item 6, wherein even when the first identification information and the second identification information match,
if the first identification information meets a first condition, and the second identification information has been acquired by the second identification information acquiring unit within a predetermined period,
the determining unit is configured to determine (i) to prohibit or limit power supply from the power supply device to the power consumption device, (ii) to output an identification abnormality signal indicating that the first identification information and the second identification information do not match, or (iii) not to output an identification normality signal indicating that the first identification information and the second identification information match.

[Item 8] The control device according to item 7, wherein the first condition is:
- a condition that the first identification information is a predetermined value or symbol; or
- a condition that the first identification information includes a predetermined value or symbol.

[Item 9] The control device according to any one of items 1 to 8, wherein
the first identification information acquiring unit is configured to acquire, as the first identification information, a piece of identification information stored in a first storage device arranged in the power supply device, and
the second identification information acquiring unit is configured to acquire, as the second identification information, a piece of identification information stored in a second storage device arranged in the power consumption device.

[Item 10] The control device according to item 9, wherein the second storage device is configured to be detachable from the power consumption device.

[Item 11] The control device according to item 9 or 10, wherein
the power supply device is configured to be detachable from the power consumption device, and
before the power consumption device and the power supply device are electrically connected, the pieces of identification information identical or corresponding to each other are written into the first storage device and the second storage device.

[Item 12] The control device according to item 11, wherein
after a user of the power consumption device has been permitted to use the power supply device, and before the power consumption device and the power supply device are electrically connected, the pieces of identification information identical or corresponding to each other are written into the first storage device and the second storage device.

[Item 13] The control device according to any one of items 1 to 12, wherein
the power supply device is configured to be detachable from the power consumption device, and
the second identification information acquiring unit is configured to acquire the second identification information from the power consumption device when it is detected that the power consumption device and the power supply device have been electrically connected.

[Item 14] The control device according to any one of items 1 to 12, wherein
the power supply device is configured to be detachable from the power consumption device, and
the first identification information acquiring unit is configured to acquire the first identification information from the power supply device when it is detected that the power consumption device and the power supply device have been electrically connected.

[Item 15] A power supply device comprising:
the control device according to any one of items 1 to 14; and
a power storage unit configured to accumulate electric power.

[Item 16] A program for causing a computer to function as the control device according to any one of items 1 to 14.

[Item 17] A control method for controlling a power supply device configured to supply electric power to a power consumption device configured to consume electric power, comprising:
acquiring first identification information which is identification information for identifying the power supply device;
acquiring second identification information which is identification information for identifying the power consumption device; and
determining, when the first identification information acquired in the acquiring of the first identification information and the second identification information acquired in the acquiring of the second identification information do not match, (i) to prohibit or limit power supply from the power supply device to the power consumption device, (ii) to output an identification abnormality signal indicating that the first identification information and the second identification information do not match, or (iii) not to output an identification normality signal indicating that the first identification information and the second identification information match.

[Item 18] A control method for controlling a power supply device configured to supply electric power to a power consumption device configured to consume electric power, comprising:
acquiring first identification information which is identification information for identifying the power supply device;
acquiring second identification information which is identification information for identifying the power consumption device; and
determining, when the first identification information acquired in the acquiring of the first identification information and the second identification information acquired in the acquiring of the second identification information match, (iv) to permit power supply from the power supply device to the power consumption device (v) not to output an identification abnormality signal indicating that the first identification information and the second identification information do not match, or (vi) to output an identification normality signal indicating that the first identification information and the second identification information match.

EXPLANATION OF REFERENCES

10: communication network, 20: driver, 22: communication terminal, 40: administrator, 100: battery management system, 110: electric motorbike, 122: mobile battery, 124: ID feeding unit, 140: collation ID writer, 160: battery station, 180: management server, 220: battery accommodating unit, 222: power connector, 224: communication connector, 240: feeding unit accommodating unit, 242: power connector, 244: communication connector, 252: power wiring, 254: signal wiring, 262: BMS, 264: ECU, 270: power control circuit, 280: motor, 322: battery detecting unit, 324: ID transfer unit, 332: battery monitoring unit, 334: battery controlling unit, 410: housing, 412: power connector, 414: communication connector, 422: positive terminal, 424: negative terminal, 430: power storage cell, 442: power control circuit, 444: monitoring circuit, 452: controller, 454: memory, 520: ID management unit, 530: collating unit, 542: power controlling unit, 612: power source, 614: communication connector, 622: ID management unit, 624: memory, 722: input unit, 724: communication unit, 730: ID writing unit, 820: battery accommodating tray, 822: power connector, 824: communication connector, 830: charging unit, 840: controlling unit, 842: communication controlling unit, 844: charging controlling unit, 846: battery managing unit, 848: ID management unit, 852: power wiring, 854: signal wiring, 920: user request processing unit, 930: battery managing unit, 940: station managing unit, 950: collation ID managing unit, 960: payment unit, 970: management information storage unit, 972: user information storage unit, 974: battery information storage unit, 976: station information storage unit, 978: ID information storage unit, 1000: data table, 1012: collation ID, 1014: unique ID, 1016: user ID, 1018: information, 1100: data table, 1112: unique ID, 1114: information, 1200: data table, 1212: unique ID, 1214: information, 1512: mobile battery, 1514: mobile battery, 1522: vehicle, 1524: vehicle, 1644: drive controlling unit, 1646: battery controlling unit, 3000: computer, 3001: DVD-ROM, 3010: host controller, 3012: CPU, 3014: RAM, 3016: GPU, 3018: display device, 3020: input/output controller, 3022: communication interface, 3024: hard disk drive, 3026: DVD-ROM drive, 3030: ROM, 3040: input/output chip, 3042: keyboard

What is claimed is:

1. A control device for controlling a power accumulation device electrically connected to a power device, comprising:
a first identification information acquiring unit configured to acquire first identification information which is identification information for identifying the power accumulation device;
a second identification information acquiring unit configured to acquire second identification information which is identification information for identifying the power device; and
a determining unit configured to determine, when the first identification information acquired by the first identification information acquiring unit and the second identification information acquired by the second identification information acquiring unit do not match, (i) to prohibit or limit power exchange between the power accumulation device and the power device, (ii) to output an identification abnormality signal indicating that the first identification information and the second identification information do not match, or (iii) not to output an identification normality signal indicating that the first identification information and the second identification information match,
wherein
when the first identification information and the second identification information do not match,
if the first identification information meets a first condition, and the second identification information could not be acquired by the second identification information acquiring unit within a predetermined period,
the determining unit is configured to determine (iv) to permit the power exchange between the power accumulation device and the power device, (v) not to output the identification abnormality signal, or (vi) to output the identification normality signal, or
wherein
if the first identification information meets a first condition, and the second identification information has been acquired by the second identification information acquiring unit within a predetermined period,
the determining unit is configured to determine; (i) to prohibit or limit the power exchange between the power accumulation device and the power device, (ii) to output the identification abnormality signal, or (iii) not to output the identification normality signal, or
wherein
if the first identification information does not meet a first condition, and the second identification information could not be acquired by the second identification information acquiring unit within a predetermined period,
the determining unit is configured to determine, (i) to prohibit or limit the power exchange between the power accumulation device and the power device, (ii) to output the identification abnormality signal, or (iii) not to output the identification normality signal.

2. The control device according to claim 1, wherein the first condition is:
a condition that the first identification information is a predetermined value or symbol; or a condition that the first identification information includes a predetermined value or symbol.

3. The control device according to claim 1, wherein prohibiting or limiting the power exchange between the power accumulation device and the power device includes prohibiting or limiting power supply from the power accumulation device to the power device.

4. A control device for controlling a power accumulation device electrically connected to a power device, comprising:
a first identification information acquiring unit configured to acquire first identification information which is identification information for identifying the power accumulation device;
a second identification information acquiring unit configured to acquire second identification information which is identification information for identifying the power device; and
a determining unit configured to determine, when the first identification information acquired by the first identification information acquiring unit and the second identification information acquired by the second identification information acquiring unit match, (iv) to permit power exchange between the power accumulation device and the power device, (v) not to output an identification abnormality signal indicating that the first identification information and the second identification information do not match, or (vi) to output an identification normality signal indicating that the first identification information and the second identification information match, wherein
when the first identification information and the second identification information match,
if the first identification information meets a first condition, and the second identification information has been acquired by the second identification information acquiring unit within a predetermined period,
the determining unit is configured to determine (i) to prohibit or limit power exchange between the power accumulation device and the power device, (ii) to output an identification abnormality signal indicating that the first identification information and the second identification information do not match, or (iii) not to output an identification normality signal indicating that the first identification information and the second identification information match.

5. The control device according to claim 4, wherein permitting the power exchange between the power accumulation device and the power device includes permitting power supply from the power accumulation device to the power device.

6. The control device according to of claim 1, wherein
the first identification information acquiring unit is configured to acquire, as the first identification information, a piece of identification information stored in a first storage device arranged in the power accumulation device, and
the second identification information acquiring unit is configured to acquire, as the second identification information, a piece of identification information stored in a second storage device arranged in the power device.

7. The control device according to claim 6, wherein the second storage device is configured to be detachable from the power device.

8. The control device according to claim 6, wherein
the power accumulation device is configured to be detachable from the power device, and
before the power device and the power accumulation device are electrically connected, the pieces of identification information identical or corresponding to each other are written into the first storage device and the second storage device.

9. The control device according to claim 8, wherein
after a user of the power device has been permitted to use the power accumulation device, and before the power device and the power accumulation device are electrically connected, the pieces of identification information identical or corresponding to each other are written into the first storage device and the second storage device.

10. The control device according to claim 1, wherein
the power accumulation device is configured to be detachable from the power device, and
the first identification information acquiring unit is configured to acquire the first identification information from the power accumulation device when it is detected that the power device and the power accumulation device have been electrically connected, or the second identification information acquiring unit is configured to acquire the second identification information from the power device when it is detected that the power device and the power accumulation device have been electrically connected.

11. The control device according to claim 1, wherein the power device is a power consumption device configured to consume electric power.

12. The control device according to claim 11, the power accumulation device is a power supply device configured to supply electric power to the power consumption device.

13. A power accumulation device comprising:
the control device according to claim 1; and
a power storage unit configured to accumulate electric power.

14. A non-transitory computer-readable storage medium having stored thereon a program, wherein the program is for causing a computer to execute a control method for controlling a power accumulation device electrically connected to a power device, wherein the control method comprises:
acquiring first identification information which is identification information for identifying the power accumulation device;
acquiring second identification information which is identification information for identifying the power device; and
determining, when the first identification information acquired in the acquiring of the first identification information and the second identification information acquired in the acquiring of the second identification information do not match, (i) to prohibit or limit power exchange between the power accumulation device and the power device, (ii) to output an identification abnormality signal indicating that the first identification information and the second identification information do not match, or (iii) not to output an identification normality signal indicating that the first identification information and the second identification information match,
wherein
when the first identification information and the second identification information do not match,
if the first identification information meets a first condition, and the second identification information could not be acquired within a predetermined period,
the determining includes determining (iv) to permit the power exchange between the power accumulation device and the power device, (v) not to output the identification abnormality signal, or (vi) to output the identification normality signal, or wherein
if the first identification information meets a first condition, and the second identification information has been acquired within a predetermined period,
the determining includes determining, (i) to prohibit or limit the power exchange between the power accumulation device and the power device, (ii) to output the identification abnormality signal, or (iii) not to output the identification normality signal, or wherein
if the first identification information does not meet a first condition, and the second identification information could not be acquired within a predetermined period,
the determining includes determining; (i) to prohibit or limit the power exchange between the power accumulation device and the power device, (ii) to output the identification abnormality signal, or (iii) not to output the identification normality signal.

15. A non-transitory computer-readable storage medium having stored thereon a program, wherein the program is for causing a computer to execute a control method for controlling a power accumulation device electrically connected to a power device, wherein the control method comprises:
acquiring first identification information which is identification information for identifying the power accumulation device;
acquiring second identification information which is identification information for identifying the power device; and
determining, when the first identification information acquired in the acquiring of the first identification information and the second identification information acquired in the acquiring of the second identification information match, (iv) to permit power exchange between the power accumulation device and the power device, (v) not to output an identification abnormality signal indicating that the first identification information and the second identification information do not match, or (vi) to output an identification normality signal indicating that the first identification information and the second identification information match, wherein
when the first identification information and the second identification information match,
if the first identification information meets a first condition, and the second identification information has been acquired within a predetermined period,
the determining includes determining (i) to prohibit or limit power exchange between the power accumulation device and the power device, (ii) to output an identification abnormality signal indicating that the first identification information and the second identification information do not match, or (iii) not to output an identification normality signal indicating that the first identification information and the second identification information match.

16. A control method for controlling a power accumulation device electrically connected to a power device, comprising:
acquiring first identification information which is identification information for identifying the power accumulation device;
acquiring second identification information which is identification information for identifying the power device; and determining, when the first identification information acquired in the acquiring of the first identification information and the second identification information acquired in the acquiring of the second identification information do not match, (i) to prohibit or limit power exchange between the power accumulation device and the power device, (ii) to output an identification abnormality signal indicating that the first identification information and the second identification information do not match, or (iii) not to output an identification normality signal indicating that the first identification information and the second identification information match, wherein
when the first identification information and the second identification information do not match,
if the first identification information meets a first condition, and the second identification information could not be acquired within a predetermined period,
the determining includes determining (iv) to permit the power exchange between the power accumulation device and the power device, (v) not to output the identification abnormality signal, or (vi) to output the identification normality signal, or wherein
if the first identification information meets a first condition, and the second identification information has been acquired within a predetermined period,
the determining includes determining; (i) to prohibit or limit the power exchange between the power accumulation device and the power device, (ii) to output the identification abnormality signal, or (iii) not to output the identification normality signal, or wherein
if the first identification information does not meet a first condition, and the second identification information could not be acquired within a predetermined period,
the determining includes determining, (i) to prohibit or limit the power exchange between the power accumulation device and the power device, (ii) to output the identification abnormality signal, or (iii) not to output the identification normality signal.

17. A control method for controlling a power accumulation device electrically connected to a power device, comprising:
acquiring first identification information which is identification information for identifying the power accumulation device;
acquiring second identification information which is identification information for identifying the power device; and
determining, when the first identification information acquired in the acquiring of the first identification information and the second identification information acquired in the acquiring of the second identification information match, (iv) to permit power exchange between the power accumulation device and the power device, (v) not to output an identification abnormality signal indicating that the first identification information and the second identification information do not match, or (vi) to output an identification normality signal indicating that the first identification information and the second identification information match, wherein
when the first identification information and the second identification information match, if the first identification information meets a first condition, and the second identification information has been acquired within a predetermined period, the determining includes determining (i) to prohibit or limit power exchange between the power accumulation device and the power device, (ii) to output an identification abnormality signal indicating that the first identification information and the second identification information do not match, or (iii) not to output an identification normality signal indicating that the first identification information and the second identification information match.

\* \* \* \* \*